United States Patent
Sejpal et al.

(10) Patent No.: US 11,514,894 B2
(45) Date of Patent: Nov. 29, 2022

(54) ADAPTIVELY MODIFYING DIALOG OUTPUT BY AN ARTIFICIAL INTELLIGENCE ENGINE DURING A CONVERSATION WITH A CUSTOMER BASED ON CHANGING THE CUSTOMER'S NEGATIVE EMOTIONAL STATE TO A POSITIVE ONE

(71) Applicant: ConverseNowAI, Austin, TX (US)

(72) Inventors: Vrajesh Navinchandra Sejpal, Bangalore (IN); Akshay Labh Kayastha, Karnataka (IN); Yuganeshan A J, Karnataka (IN); Pranav Nirmal Mehra, Bangalore (IN); Rahul Aggarwal, Austin, TX (US); Vinay Kumar Shukla, Austin, TX (US); Zubair Talib, Irvine, CA (US)

(73) Assignee: ConverseNowAI, Austin, TX (US)

( * ) Notice: Subject to any disclaimer, the term of this patent is extended or adjusted under 35 U.S.C. 154(b) by 0 days.

(21) Appl. No.: 17/530,453

(22) Filed: Nov. 18, 2021

(65) Prior Publication Data
US 2022/0270594 A1     Aug. 25, 2022

Related U.S. Application Data

(63) Continuation-in-part of application No. 17/184,207, filed on Feb. 24, 2021.

(51) Int. Cl.
*G10L 15/18* (2013.01)
*G07G 1/00* (2006.01)
(Continued)

(52) U.S. Cl.
CPC ...... *G10L 15/1815* (2013.01); *G06Q 30/0631* (2013.01); *G06Q 30/0633* (2013.01); *G10L 15/16* (2013.01); *G10L 15/26* (2013.01)

(58) Field of Classification Search
CPC .............. G10L 15/1822; G07G 1/0036; G06Q 30/0631
See application file for complete search history.

(56) References Cited

U.S. PATENT DOCUMENTS 5,357,596 A   10/1994   Takebayashi et al.
5,625,749 A   4/1997   Goldenthal et al.
(Continued)

FOREIGN PATENT DOCUMENTS

CN     106503786     *   3/2017

*Primary Examiner* — Farzad Kazeminezhad
(74) *Attorney, Agent, or Firm* — Shiv S. Naimpally; Grable Martin Fulton PLLC

(57) ABSTRACT

In some examples, a server may receive an utterance from a customer. The utterance may be included in a conversation between the artificial intelligence engine and the customer. The server may convert the utterance to text and determine a customer intent based on the text and a user history. The server may determine a user model of the customer based on the text and the customer intent. The server may update a conversation state associated with the conversation based on the customer intent and the user model. The server may determine a user state based on the user model and the conversation state. The server may select, using a reinforcement learning based module, a particular action from a set of actions, the particular action including a response and provide the response to the customer.

20 Claims, 9 Drawing Sheets

(51) Int. Cl.
    *G06Q 30/06* (2012.01)
    *G10L 15/26* (2006.01)
    *G10L 15/16* (2006.01)

(56) References Cited

U.S. PATENT DOCUMENTS

| | | |
|---|---|---|
| 6,330,539 B1 | 12/2001 | Takayama et al. |
| 7,110,963 B2 | 9/2006 | Negreiro |
| 9,129,289 B2 | 9/2015 | Vaughn et al. |
| 9,626,703 B2 | 4/2017 | Kennewick |
| 10,055,685 B1 | 8/2018 | Arel et al. |
| 10,162,794 B1 | 12/2018 | Arel et al. |
| 10,210,861 B1 | 2/2019 | Arel et al. |
| 10,325,223 B1 | 6/2019 | Arel et al. |
| 10,559,299 B1 | 2/2020 | Arel et al. |
| 10,573,296 B1 | 2/2020 | Arel et al. |
| 10,628,635 B1 | 4/2020 | Carpenter et al. |
| 10,878,824 B2 | 12/2020 | Carpenter et al. |
| 11,023,955 B1 | 6/2021 | Carpenter et al. |
| 2002/0111881 A1 | 8/2002 | Walker et al. |
| 2003/0144846 A1 | 7/2003 | Denenberg et al. |
| 2006/0076397 A1 | 4/2006 | Langos |
| 2007/0040026 A1 | 2/2007 | Vleet et al. |
| 2011/0131038 A1 | 6/2011 | Oyaizu et al. |
| 2016/0078504 A1 | 3/2016 | Kennewick |
| 2017/0160813 A1 | 6/2017 | Divakaran et al. |
| 2018/0096681 A1* | 4/2018 | Ni .................. G10L 15/1822 |
| 2018/0108048 A1* | 4/2018 | Yoon ............... G06Q 30/0631 |
| 2018/0308100 A1 | 10/2018 | Haukioja et al. |
| 2019/0108566 A1 | 4/2019 | Coleman et al. |
| 2019/0251611 A1 | 8/2019 | Coleman et al. |
| 2019/0266561 A1 | 8/2019 | Koeppel et al. |
| 2019/0378533 A1 | 12/2019 | Chao |
| 2020/0034848 A1 | 1/2020 | Seo et al. |
| 2020/0160850 A1 | 5/2020 | Lin et al. |
| 2020/0226667 A1 | 7/2020 | Kalaimani |
| 2020/0273089 A1 | 8/2020 | Siefken et al. |
| 2020/0279556 A1 | 9/2020 | Gruber et al. |
| 2020/0311804 A1 | 10/2020 | Buckholdt et al. |
| 2020/0387954 A1* | 12/2020 | Sadhankar ........... G07G 1/0036 |
| 2021/0158407 A1 | 5/2021 | Mimassi |

\* cited by examiner

ADAPTIVELY MODIFYING DIALOG OUTPUT BY AN ARTIFICIAL INTELLIGENCE ENGINE DURING A CONVERSATION WITH A CUSTOMER BASED ON CHANGING THE CUSTOMER'S NEGATIVE EMOTIONAL STATE TO A POSITIVE ONE

CROSS-REFERENCE TO RELATED APPLICATIONS

The present patent application is a continuation-in-part of U.S. patent application Ser. No. 17/184,207, filed on Feb. 24, 2021, entitled "DETERMINING ORDER PREFERENCES AND ITEM RECOMMENDATIONS", which is incorporated by reference herein in its entirety and for all purposes as if completely and fully set forth herein.

BACKGROUND OF THE INVENTION

Field of the Invention

This invention relates generally to systems to automatic speech recognition and, more particularly to modifying an output of an automated speech recognition system using machine learning.

Description of the Related Art

Restaurants face many challenges. One challenge is to hire and retain employees. One way to reduce the number of employees is to enable ordering over voice channels (e.g., phone orders, drive through, and the like) by integrating a voice-recognition platform into the restaurant's communication system. However, most voice-recognition platforms suffer from issues that annoy and/or frustrate customers. For example, the voice-recognition platform may converse with a customer at the same pace, regardless of whether the customer is in a hurry and wants to quickly place an order or whether the customer is unfamiliar with the menu and wants more time to understand the menu while ordering. As another example, the voice-recognition may ask the customer to confirm each selection before advancing.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some examples, a server may receive an utterance from a customer. The utterance may be included in a conversation between the artificial intelligence engine and the customer. The server may convert the utterance to text and determine a customer intent based on the text and a user history. The server may determine a user model of the customer based on the text and the customer intent. The server may update a conversation state associated with the conversation based on the customer intent and the user model. The server may determine a user state based on the user model and the conversation state. The server may select, using a reinforcement learning based module, a particular action from a set of actions, the particular action including a response and provide the response to the customer.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
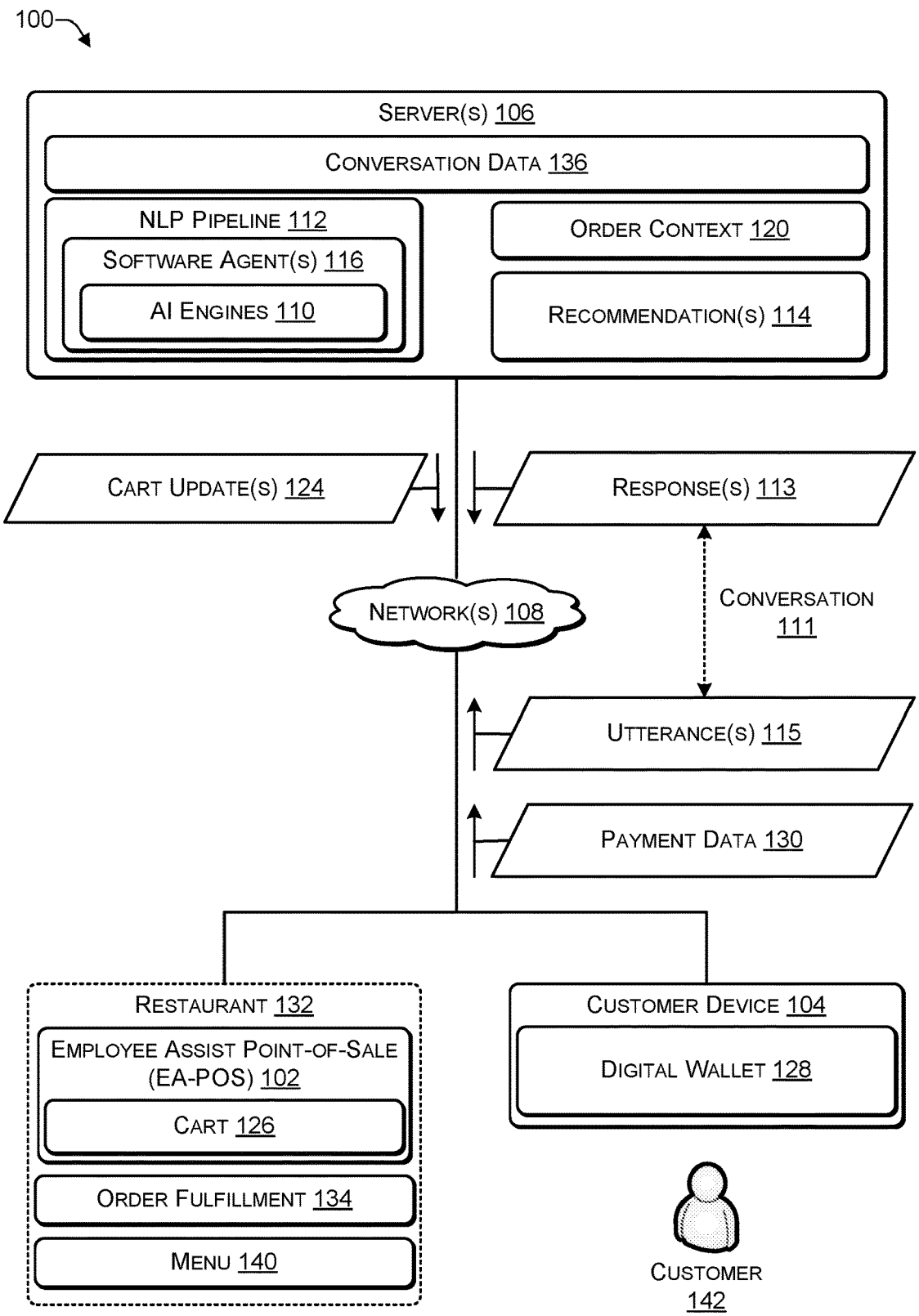
FIG. 1 is a block diagram of a system that includes a server to host one or more artificial intelligence (AI) engines to engage in a conversation with a customer, according to some embodiments.

U.S. patent application Ser. No. 17/184,207 describes a system in which a machine learning algorithm (e.g., an artificial intelligence (AI) engine) monitors a conversation between a customer and an employee at a restaurant. As the system is monitoring the conversation, the system interacts with a point-of-sale (POS) terminal to add, subtract, modify, or any combination thereof the contents of a cart. For example, if the customer is placing an order for one or more food items, the system may automatically add contents to the cart based on the customer's voice input. To illustrate, if the customer says "Two large pepperoni pizzas" then the system automatically (e.g., without human interaction) adds two large pepperoni pizzas to the cart. Thus, the employee verbally interacts with the customer, without interacting with the point-of-sale terminal, and with the system interacting with the point-of-sale terminal. The employee observes the system modifying the contents of the cart while the employee is verbally interacting with the customer. The employee may interact with the point-of-sale terminal to make corrections if the system makes an error. The system may provide upsell recommendations to the employee to provide to the customer. The upsell recommendations may include increasing a size of an item ordered by the customer (e.g., "Would you like an extra-large instead of a large for just two dollars more?", adding an item (e.g., "Would you like to add something to drink?"), or both. The upsell recommendations may be provided to the employee via, for example, audibly (e.g., via an earpiece) or visually (e.g., displayed on the point-of-sale terminal). In addition, the system may be used to train new employees by prompting them as to what to say to the customer during a conversation to take an order. The conversation data is collected and used to train the AI engine to enable the AI engine to interact with customers in a human-like conversation.

The systems and techniques described herein use Reinforcement Learning (RL) (or similar type of machine learning) to enable the AI engine to adapt to individual customers while the AI engine is engaged in a conversation with each customer. In RL, software agents (e.g., instances of the AI engine) take actions to earn a largest cumulative reward. Unlike supervised learning, RL may not use labelled input/output pairs. RL find a balance between exploration (e.g., uncharted territory) and exploitation of current knowledge. In RL, the software designers create an environment in which desired behaviors are rewarded and negative behaviors are punished. For example, positive values may be assigned to desired actions to encourage such actions and negative values may be assigned to undesired behaviors to discourage such actions. In this way, each software agent seeks a long-term and maximum overall reward. The long-term goal is designed to prevent the software agent from stalling (e.g., getting stuck on) on lesser goals. Over time, the software agent learns to avoid negative actions and perform positive actions. For example, in the context of an AI taking an order from a customer, the AI may present a recommendation, such as, "Would you like extra cheese", "Would you like to add a bottle of cola?" or the like. If the customer accepts the recommendation, then the software agent may be rewarded (e.g., add 1 to cumulative reward). If the customer rejects the recommendation, then the software agent may be punished (e.g., subtract 1 from cumulative reward). In this example, if the customer rejects more than one recommendation, then the software agent may adaptively provide fewer recommendation during the conversation with the customer. If the customer accepts a recommendation, then the software agent may adaptively provide additional recommendations during the conversation with the customer. In this way, the software agent adapts to, during the conversation with the customer, whether the customer is open to recommendations (e.g., upsells). The environment in which the software agent operates may be stated in the form of a Markov decision process (MDP), because the RL algorithm may use dynamic programming techniques.

RL builds on top of supervised models to improve dialog policies based on overall reward for a complete conversation. For example, rewards may be higher (positive) for success, lower (negative) for rejection, and neutral (zero) for everything else. Based on the reward, the software agent learns dialog policies at runtime by identifying a model for the customer and adjusting actions (including responses to the customer) based on the model. For example, upselling may be based on brand and/or product specific upselling rules that are set by each specific brand, store, or franchise. The software agent may make decisions based in part on one or more community models in which the software agent learns user behavior associated with different groups to which individual customers may belong. For example, the groups may include groups defined by region (e.g., people living in a particular geographic area tend to order X and Y but not Z). The groups may include groups defined by gender (e.g., males tend to order X and women tend to order Y). The groups may include groups defined by age (e.g., 12 years old and under tend to order A, 13- to 19-year-old tend to order B or C, 20- to 30-year-old tend to order D, and so on). The software agent may make personalized model-based recommendation based on learning user preferences based on a customer's previous order history.

The systems and techniques described herein enable individual software agents to achieve a conversation that is natural sounding and simulates conversing with a human (rather than an AI). For example, the software agent may use RL to determine if a customer is in a hurry or not in a hurry ("relaxed") and adapt the conversation accordingly. If the software agent determines that the customer is in a hurry to place an order, the software agent may reduce a verbosity level and provide fewer options, fewer upsell recommendations, and the like. If the customer is relaxed and engaged with the software agent, then the customer may find efficient and task-oriented dialog monotonous. In such situations, the software agent may increase (or at least not reduce) a verbosity level, provide options, provide recommendations, and the like. The software agent may use RL to adapt to a comfort level of the customer in conversing with an AI. For example, customers that have had relatively few conversations with an AI may be uncomfortable conversing with an AI. In such situations, the AI may help customers by guiding them step-by-step (e.g., "You can say things like . . . ") to place an order, even if the resulting conversation is not a human-like conversation. For customers that are comfortable conversing with an AI (e.g., have previous experience interacting with an AI), the software agent may not provide step-by-step interaction instructions. In such situations, the software agent may provide more personalized dialog to the customer. The software agent may use RL to determine the customer's cost sensitivity and adapt the conversation accordingly. For example, the software agent may determine that the customer is cost sensitive, e.g., the customer asks "What can I get for $X?", "Can you recommend something less expensive?" or the like. For a cost sensitive user, the conversation (including upselling) may be adjusted to provide value within a particular budget. For a non-cost sensitive user, the software agent may provide recommendations (including upselling) that may not be constrained by cost. In such situations, the software agent may adjust the conversation to provide recommendations that work well within the overall order and provide a better food experience for the customer. For example, the recommendations may include an item that is frequently purchased with other items that the customer is purchasing, an item that the restaurant or business has previously identified as pairing well with other items that the customer is purchasing, or the like.

The systems and techniques described herein determine a type of customer based on the words the customer uses, the speed of the delivery of the words, the inflection and pitch of the words, one or more emotions conveyed by the words, other information, or any combination thereof. The type of customer is used to determine a user model. The systems and techniques use the user model and a conversation state to adapt, in real-time, the dialog flow and recommendations. By gaining a deeper understanding of the customer, the systems and techniques are able to improve the entire user experience when placing an order. The systems and techniques focus on three areas: (1) when to recommend (e.g., based on urgency detection and the like), (2) what to recommend (e.g., based on cost-sensitivity and the like), and (3) verbosity level that balances naturalness (e.g., chattiness) with step-by-step guidance. The dialog is adapted using reinforcement learning in which a point is added (reward) or subtracted (punishment) based on whether a recommendation is provided or not provided, whether the provided recommendation is accepted or rejected, an urgency level (e.g., reward if customer praises fast order taking, punish if customer complains about slow process of placing an order), and cost sensitivity (does customer express gratitude or displeasure for individual items, total order cost, or both). The systems and techniques may weight dialog naturalness (e.g., chatty) and step-by-step instructions (e.g., guided). A task completion reward may be associated with whether a recommendation was accepted or rejected, a number of turns in the conversation (one complete turn is the customer speaking followed by a response from the software agent), an urgency level of the customer (in a hurry or relaxed), and a proficiency of the customer in terms of interacting with an AI.

As a first example, a server performs a method. The method includes receiving, by an artificial intelligence engine executing on the server, an utterance from a customer. The utterance is included in (e.g., part of) a conversation between the artificial intelligence engine and the customer. The method includes converting the utterance to text. The method includes determining a customer intent based on the text and a user history. For example, the customer intent may include at least one of: (1) initiating an order, (2) adding an item to a cart, (3) deleting the item from the cart, (4) modifying the item in the cart, (5) requesting addition information regarding a menu item, (6) indicating that the customer has completed the order, (7) providing payment for an order, or (8) any combination thereof. The user history may include: an order history associated with the customer, a conversation history of the conversation, and user feedback previously provided by the customer. The order history may include one or more items of a current order that have been placed in a cart and previously ordered items from one or more previous orders. The method includes determining a user model of the customer based on the text and the customer intent. The method includes updating a conversation state associated with the conversation based on the customer intent and the user model. The method includes determining a user state based on the user model and the conversation state. The method includes selecting, using a reinforcement learning based module executing on the server, a particular action from a set of actions. The particular action includes a dialog response. The method includes providing, by the artificial intelligence engine, the response to the customer. The method may include determining, based at least in part on the user state and the conversation state, a reward for the reinforcement learning based module. The reward may be one of a positive reward, a negative reward, or a neutral reward. For example, the reward may be the positive reward when the text includes a recommendation indication of an acceptance of a recommendation, an emotion indication of a positive emotional state, a number of turns in the conversation (e.g., number of turns less than a predetermined amount), or any combination thereof. As another example, the reward may be the negative reward when the text includes a recommendation indication of a rejection of a recommendation, an emotion indication of a negative emotional state, a clarification request, a number of turns in the conversation, or any combination thereof.

As a second example, a server includes one or more processors and one or more non-transitory computer readable media to store instructions that are executable by the one or more processors to perform various operations. For example, the operations may include receiving, by an artificial intelligence engine executing on the server, an utterance from a customer. The utterance is included in a conversation between the artificial intelligence engine and the customer. The operations include converting the utterance to text and determining a customer intent based on the text and a user history. The operations include determining a user model of the customer based on the text and the customer intent and updating a conversation state associated with the conversation based on the customer intent and the user model. The user model may include one or more of: an urgency level of the customer, a comfort level associated with the customer in conversing with the artificial intelligence engine, a cost sensitivity of the customer, or any combination thereof. The operations include determining a user state based on the user model and the conversation state. The operations may include determining, based on one or more of the utterance, the customer intent, the user history, the user model, the user state, or any combination thereof, an urgency level associated with the customer, and adjusting a verbosity of a reinforcement learning based module based on the urgency level. For example, the verbosity may be decreased when the urgency level is high. The operations may include determining, based on one or more of the utterance, the customer intent, the user history, the user model, the user state, or any combination thereof, a comfort level of the customer in conversing with the artificial intelligence engine, and adjusting the reinforcement learning based module based on the comfort level. For example, the reinforcement learning based module may provide the customer with conversing suggestions based on determining that the comfort level is below a threshold. The operations may include determining, based on one or more of the utterance, the customer intent, the user history, the user model, the user state, or any combination thereof, a cost sensitivity of the customer, and adjusting the reinforcement learning based module based on the cost sensitivity. For example, adjusting the reinforcement learning based module based on the cost sensitivity may include: recommending lower cost menu items when the cost sensitivity is high, and recommending higher cost menu items when the cost sensitivity is low. The operations include using the reinforcement learning based module to select a particular action from a set of actions, the particular action including a response and providing, by the artificial intelligence engine, the response to the customer. In some cases, the reinforcement learning based module may include an epsilon-greedy random algorithm that picks: a current best option a threshold percentage of times, and a random option having a low probability at remaining times.

As a third example, a memory device may be used to store instructions executable by one or more processors to perform various operations. The operations include receiving, by an artificial intelligence engine executed by the one or more processors, an utterance from a customer. The utterance is included in a conversation between the artificial intelligence engine and the customer. The operations include converting the utterance to text and determining a customer intent based on the text and a user history. The customer intent may include one or more of: initiating an order, adding an item to a cart, deleting the item from the cart, modifying the item in the cart, requesting addition information regarding a menu item, indicating that the customer has completed the order, paying for an order, or any combination thereof. The user history may include: (1) an order history associated with the customer, (2) a conversation history of the conversation, and (3) user feedback previously provided by the customer. The operations include determining a user model of the customer based on the text and the customer intent. The operations include updating a conversation state associated with the conversation based on the customer intent and the user model. The conversation state may include one or more of: (1) items included in a cart associated with the customer, (2) a conversation history of the conversation including (i) a previous utterance of the customer and (ii) a previous response provided by the artificial intelligence engine, (3) the text, (4) a recommendation history including (i) current recommendation provided in the conversation and (ii) previous recommendations provided in previous conversations, (5) an average emotional sentiment associated with the conversation, or any combination thereof. The operations include determining a user state based on the user model and the conversation state. The operations include selecting, using a reinforcement learning based module executed by the one or more processors, a particular action from a set of actions. The particular action includes a response. The operations include providing, by the artificial intelligence engine, the response to the customer. The operations may include determining, based at least in part on the user state and the conversation state, a reward for the reinforcement learning based module. The reward may be one of (1) a positive reward, (2) a negative reward, or (3) a neutral reward. The reinforcement learning based module may implement an epsilon-greedy random algorithm that picks a current best option a threshold percentage of times and a random option having a low (e.g., epsilon) probability at remaining times.

FIG. 1 is a block diagram of a system 100 that includes a server to host software, according to some embodiments. The system 100 includes a representative employee-assistance point-of-sale (EA-POS) device 102, a customer device 104, and one or more server(s) 106 connected to each other via one or more network(s) 108. The server 106 may include an AI engine(s) 110 (e.g., a machine learning algorithm), a natural language processing (NLP) pipeline 112, and a software agent 116.

A customer 142 may use the customer device 104 to initiate a order to a commerce site, such as a restaurant 132. A restaurant is used merely as an example and it should be understood that the systems and techniques described herein can be used for other types of commerce, such as ordering groceries, ordering non-perishable items and the like. In some cases, a human employee may receive the order and the AI engine(s) 110 may monitor the conversation 111, including utterances 115 of the customer 142 and responses 113. The utterances 115 are the raw audio as uttered by the customer 142. Initially, the responses 113 may be from a human employee of the restaurant 132. The AI engine(s) 110 may determine which items from a menu 140 of the restaurant 132 the customer 142 is ordering. The AI engine(s) 110 may monitor the conversation 111 between the customer 142 and the employee and automatically (e.g., without human interaction) modify a cart 126 hosted by the EA-POS device 102. In other cases, a human employee may receive the order, the AI engine(s) 110 may monitor the conversation between the customer 142 and the employee, and monitor what the employee enters into the EA-POS device 102. The employee entries may be used as labels when training the AI engine(s) 110 and various machine learning (ML) models in the NLP pipeline 112. The AI engine(s) 110 may keep a running track of an order context 120 associated with each particular order. The order context 120 may include order data associated with previously placed orders by the customer 142, trending items in a region in which the customer 142 is located, specials/promotions (e.g., buy one get one free (BOGO), limited time specials, regional specials, and the like) that the restaurant 132 is currently promoting (e.g., on social media, television, and other advertising media), and other context-related information. The order context 120 may include user preferences, such as gluten allergy, vegan, vegetarian, or the like. The user may specify the preferences or the AI engines 110 may determine the preferences based on the customer's order history. For example, if the customer 142 orders gluten-free products more than once, then the AI engines 110 may determine that the customer 142 is gluten intolerant and add gluten intolerance to the customer's preference file. As another example, if the customer 142 orders vegan or vegetarian items (or customizes menu items to be vegan or vegetarian) then the AI engines 110 may determine that the customer 142 is vegan or vegetarian and add vegan or vegetarian to the customer's preference file. The cart 126 may include other information as how the order is to be fulfilled (e.g., pickup or delivery), customer address for delivery, customer contact information (e.g., email, phone number, etc.), and other customer information.

The customer 142 may use a payment means, such as a digital wallet 128, to provide payment data 130 to complete the order. In response, the restaurant 132 may initiate order fulfillment 134 that includes preparing the ordered items for take-out, delivery, or in-restaurant consumption. Such conversations between human employees and customers may be stored as conversation data 136. The conversation data 136 is used to train a software agent 116 to take orders from customers in a manner similar to a human employee, such that the customers may be unaware that they are interacting with the software agent 116 rather than a human employee.

Subsequently (e.g., after the software agent 116 has been trained using the conversation data 136), when the customer 142 uses a customer device 104 to initiate a communication to the restaurant 132 to place an order, the communication may be routed to the software agent 116. The customer 142 may have a conversation 111 that includes utterances 115 of the customer 142 and responses 113 by the software agent 116. In most cases, the conversation 111 does not include an employee of the restaurant. The conversation may be routed to a human being under particular exception conditions, such as due to an inability of the software agent 116 to complete the conversation 111 or the like.

The conversation 111 may include voice, text, touch input, or any combination thereof. For example, in some cases, the conversation 111 may include the voice of the customer 142 and the responses 113 of the software agent 116 may be vocalized (e.g., converted into a synthesized voice) using text-to-speech technology. The conversation 111 may include text input and/or touch input in which the customer 142 enters order information using a website, an application ("app"), a kiosk, or the like. One or more of the utterances 115 may result in the server 106 sending a cart update 124 to update a cart 126 at the point-of-sale device 102. The AI engine(s) 110 may determine (e.g., predict) recommendations 114 that the software agent 116 provides in the responses 113 as part of the conversation 111. For example, the recommendations 114 may be based on items that the customer 142 has previously ordered, items that are currently popular in the customer 142's region (e.g., zip code, city, county, state, country, or the like), and the like. To determine items that the customer 142 previously ordered, the AI engine(s) 110 may determine an identity of the customer 142 based on, for example, an identifier (e.g., a phone number, an Internet protocol (IP) address, caller identifier, or the like) associated with the customer device 104, voice recognition, facial recognition (e.g., in the case of a video call), or another identifying characteristic associated with the order initiated by the customer device 104.

After the customer 142 has completed an order, the customer 142 may provide payment data 130, for example using an account (e.g., bank account, credit card account, debit card account, gift card account, or the like) stored in a digital wallet 128. The payment data 130 may be sent to the point-of-sale device 102 to complete a checkout process for the cart 126. After the payment data 130 has been received and the payment data processed, the restaurant 132 may initiate order fulfillment 134, such as preparing the items in the order for take-out, delivery, in-restaurant dining, or the like.

Thus, the system 100 includes an automated ordering system to enable customers to initiate and complete an order using voice, written text, or commands entered via a user interface (UI) provided by a website, an application ("app") or the like. The system 100 is configured to enable the interactions between human customers and software agents 116 to be natural and human-like to such a degree that the human customers may conclude that they interacted with a human rather than a software agent. Thus, in so far as ordering food from a restaurant is concerned, the software agents 116 may pass the Turing test. The software agents 116 engage in human-like conversations in which the software agents 116 exhibit flexibility in the dialog. The software agents 116 are trained, based on the conversation data, to have an understanding of complex natural language utterances that take into account the nuances of oral and written communications, including both formal communications and informal communications. The term 'utterance' may include anything spoken or typed by a customer, including a word, a phrase, a sentence, or multiple sentences (including incomplete sentences that can be understood based on the context).

The system 100 includes a voice ordering system that takes the utterances 115 of a customer 142 and processes the utterances 115 through the Natural Language Processing (NLP) pipeline 112 (also referred to as a Natural Language Understanding (NLU) pipeline). The output of the NLP pipeline 112 are used by the server 106 to select: (1) a next one of the responses 113 that the software agent 116 provides the customer 142 in the conversation 111 and (2) the cart updates 124 to update the cart 126.

The systems and techniques described herein provide a data-driven approach to the NLP pipeline 112. The conversation data 136 includes hundreds of thousands of conversations between a human customer and a human employee and is used to train a supervised machine learning model (e.g., the software agents 116) to make the responses 113 of the software agents 116 as human-like as possible. The conversation data 136 includes human-to-human conversations used to train a domain specific language model (e.g., the software agents 116). The systems and techniques described herein take advantage of newly available language models that provide a greater capacity for leveraging contextual information over the utterances 115 (e.g., a word, a phrase, a sentence, or multiple sentences including incomplete sentences).

Thus, an AI engine may be used to listen in on conversations between customers and human employees. The AI engine may automatically populate and modify a cart associated with an order that each customer is placing. The AI engine may automatically provide recommendations to the human employees on up-selling (e.g., adding items, increasing a size of ordered items, or both). The conversation data between customers and human employees may be stored to create a database of conversations associated with, for example, ordering food at a restaurant or another type of commerce site. The database of conversation data may be gathered over multiple months or years and used to train a machine learning algorithm, such as a software agent, to automatically take an order from a customer as if the customer was having a conversation with a restaurant employee. For example, given a conversation context and an utterance from the customer, the software agent determines and verbalizes (e.g., using text-to-speech) an appropriate and automated response using a natural language processing pipeline.

Figure 2:
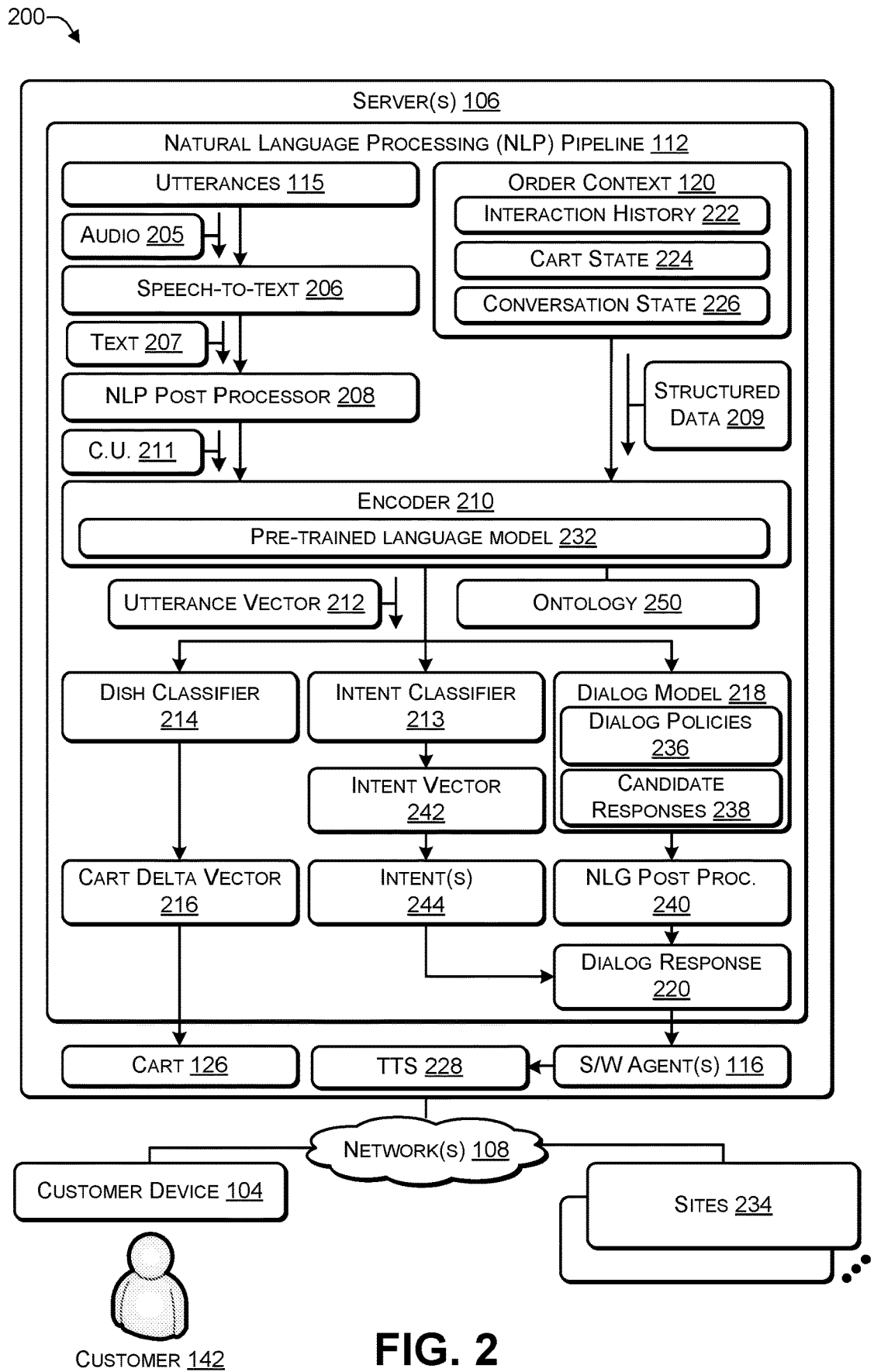
FIG. 2 is a block diagram of a natural language processing (NLP) pipeline, according to some embodiments.

FIG. 2 is a block diagram 200 of the natural language processing (NLP) pipeline 112 of FIG. 1, according to some embodiments. The NLP pipeline 112 may receive the utterances 115 of the customer 142 (e.g., from the customer device 104 of FIG. 1). The NLP pipeline 112 may process audio data 205 that includes at least a portion of the utterances 115 using a speech-to-text 206 to convert the audio data 205 to text 207. For example, the utterances 115 may be "I would like 2 large pizzas with pepperoni and mushrooms."

The order context 120 may include an interaction history 222 between the software agent 116 and the customer 142, a current cart state 224, and a conversation state 226. The interaction history 222 may include interactions between the customer 142 and one of the software agents 116, including the utterances 115 of the customer 142 and the responses 113 of the software agent 116. The cart state 224 identifies a state of the customer's cart including, for example, items in the cart, how many of each item is in the cart, a price associated with each item, a total price associated with the cart, whether payment has been received (e.g., whether the cart has been through check out), a most recent change (e.g., addition, subtraction, or modification) to one or more items in the cart, other cart related information, or any combination thereof. The conversation state 226 may indicate a state of the conversation between the customer 142 and the software agent 116, such as whether the conversation is in progress or has concluded, whether the customer 142 is asked a question and is waiting for a response from the software agent 116, whether the software agent 116 has asked a question and is waiting for a response from the customer 142, a most recent utterance from the customer 142, a most recent response from the software agent 116, other conversation related information, or any combination thereof.

The utterances 115 are provided by the customer 142 that has contacted the restaurant 132 of FIG. 1 to place an order. The utterances 115 are in the form of the audio data 205. The speech-to-text 206 converts the audio 205 into text 207. The text 207 is processed using an NLP post processor 208 that makes corrections, if applicable, to the text 207 to create corrected utterances 211. For example, the text 207 may include an incorrect word that is plausible in the context and multiple similar sounding words may be equally plausible. The NLP post processor 208 may make corrections by identifying and correcting one or more incorrect words in the text 207 to create corrected utterances 211. After the NLP post processor 208 processes the text 207, the corrected utterances 211 are sent to the encoder 210.

The order context 120, including the interaction history 222, the cart state 224, and the conversation state 226, are provided to the encoder 210 in the form of structured data 209. The structured data 209 includes defined data types that enable the structured data 209 to be easily searched. Unstructured data is raw text, such as "two pizzas with sausage and pepperoni". Structured data may use a structured language, such as JavaScript Object Notation (JSON), Structured Query Language (SQL), or the like to represent the data. For example, "two pizzas with sausage and pepperoni" may be represented using structured data as: {"Quantity": 2, "Item": "Pizza", "Modifiers": ["Pepperoni", "Sausage"]}. In structured data 209, each data item has an identifier or some fixed structured meaning and is not subject to natural language meaning or interpretation. The order context 120 captures where the customer 142 and the software agent 116 are in the conversation 111 (e.g., what has already been said), what items are in the cart 126, and the like.

The encoder 210 of the NLP pipeline 112 receives the text 207 (in the form of the corrected utterances 211) and the structured data 209 as input and predicts an utterance vector 212. For example, the encoder 210 may use word2vec, a two-layer neural net, to process the text 207 to create the utterance vector 212. The input to the NLP pipeline 112 is a text corpus and the output is a set of vectors, e.g., feature vectors that represent words in that corpus. The encoder 210 thus converts the text 207 into a numerical form that deep neural networks can understand. The encoder 210 looks for transitional probabilities between states, e.g., the likelihood that two states will co-occur. The NLP pipeline 112 groups vectors of similar words together in vector space to identify similarities mathematically. The vectors are distributed numerical representations of features, such as menu items. Given enough data, usage, and contexts during training, the encoder 210 is able to make highly accurate predictions about a word's meaning based on past appearances. The predictions can be used to establish the word's association with other words (e.g., "man" is to "boy" what "woman" is to "girl"), or cluster utterances and classify them by topic. The clusters may form the basis of search, sentiment analysis, and recommendations. The output of the encoder 210 is a vocabulary in which each item has a vector attached to it, which can be fed into a deep-learning net or simply queried to detect relationships between words. For example, by using cosine as a similarity measure, no similarity is expressed as a 90-degree angle, while total similarity is a 0-degree angle, complete overlap.

The encoder 210 may include a pre-trained language model 232 that predicts, based on the most recent utterances 115 and the current order context 120, (1) how the cart 126 is to be modified and (2) what the software agent 116 provides as a response, e.g., dialog response 220. The encoder 210 is a type of machine learning model for NLP that is a model pre-trained directly from a domain specific corpora. In some cases, the encoder 210 may use a Bidirectional Encoder Representations from Transformers (BERT), e.g., a transformer-based machine learning technique for natural language processing (NLP), to predict the utterance vector 212. The encoder 210 may be a language model 232 that converts the text 207 of the utterances into a vector of numbers. The language model 232 may be fine-tuned to a specific domain, e.g., to ordering at a restaurant and that too, at a specific type of restaurant (e.g., pizza, wings, tacos, etc.). The training is based on the conversation data 136 that has been gathered over time between customers and employees who enter data in the EA-POS 102. The employee entered data may be used as labels for the conversation data 136 when training the various machine learning models described herein. The language model 232 associates a specific utterance, e.g., "I want chicken wings", with a specific action, e.g., entering a chicken wing order into the EA-POS 102. The language model 232 predicts what items from the menu 140 are to be added to the cart 126 (e.g., based on one or more actions associated with the utterance 115) and which items are to be removed from the cart 126, quantities, modifiers, or other special treatments (e.g., preparation instructions such as "rare", "medium", "well done" or the like for cooking meat) associated with the items that are to be added and/or removed. In some aspects, the encoder 210 may be implemented as a multi-label classifier. Modifiers may include, for example, half pepperoni, half sausage, double cheese, and the like. In some cases, the language model 232 may be structured hierarchically, e.g., with pizza at a high level and modifiers at a lower level. Alternately, the language model 232 may use a flat system with every possible combination as a unique item.

The utterance vector 212 may be used by three classifiers (e.g., a type of machine learning algorithm, such as a support vector machine or the like), including the dish classifier, the intent classifier 213, and the dialog model 218. For example, the utterance vector 212 may be used by the dish classifier 214 to predict a multiclass cart delta vector 216. The multiclass cart delta vector 216 is used to modify the cart 126. For example, in the cart delta vector 216, the first position may indicate a size of the pizza, e.g., 1=small, 2=medium, 3=large, the second position may indicate a type of sauce, e.g., 0=no sauce, 1=1st type of sauce, 2=2nd type of sauce, the third position may indicate an amount of cheese, e.g., 0=no cheese, 1=normal cheese, 2=extra cheese, 3=double cheese, and the remaining positions may indicate the presence (e.g., 1) or the absence (e.g., 0) of various toppings, e.g., pepperoni, mushrooms, onions, sausage, bacon, olives, green peppers, pineapple, and hot peppers. Thus, (3, 1, 1, 1, 0, 0, 0, 0, 0, 0, 0, 0) is a vector representation of a large pizza with the first type of sauce, a normal amount of cheese, and pepperoni. If the utterances 115 includes "I'd like double cheese", then the vector representation may change to (3, 1, 3, 1, 0, 0, 0, 0, 0, 0, 0, 0), resulting in a corresponding change to the cart 126. Of course, this is merely an example and other vector representations may be created based on the number of options the restaurant offers for pizza size, types of sauces, amount of cheese, toppings, and the like.

The encoder 210 outputs the utterance vector 212 which a dialog model 218 uses to determine a predicted dialog response 220. For example, based on the order context 120 and the most recent utterances 115, the encoder 210 may determine the predicted response 220. The predicted response 220 is a prediction as to what a human employee would say at that point in the conversation (e.g., order context 120) based on the customer's most recent utterances 115. The encoder 210 is trained using the conversation data 136 to predict the dialog response 220 based on the utterances 115 and the order context 120. The software agent 116 converts the predicted dialog response 220 to speech using a text-to-speech converter 228. The dialog model may use dialog policies 236, candidate responses 238, and the order context 120 to predict the dialog response 220. For example, if the customer 142 states that they would like to order a burger, an appropriate response may be "what toppings would you like on that burger?" In some cases, a natural language generation (NLG) post processor 240 may modify the output of the dialog model 218 to create the dialog response 220. For example, the NLG post processor 240 may modify the dialog response 220 to include local colloquialisms, more informal and less formal dialog, and the like. The NLG response is the translation of the dialog response 220 into natural language.

Figure 5:
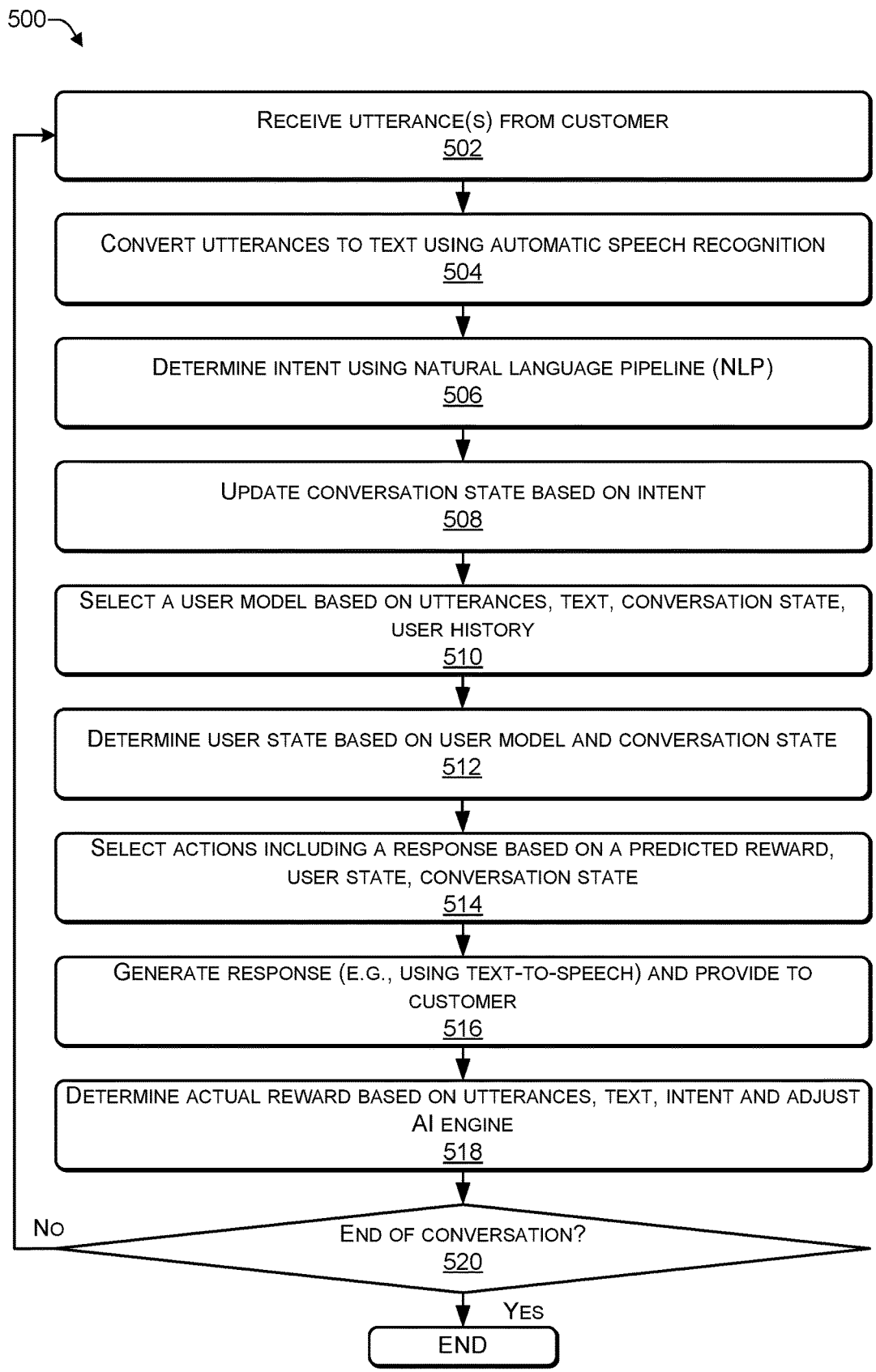
FIG. 5 is a flowchart of a process that includes determining a reward and adjusting an AI, according to some embodiments.

During training of the machine learning model used to create the software agents 116, the human-to-human conversations in the conversation data 136 of FIG. 1 are labelled to fine tune the language model 232, as described in more detail in FIG. 5. The utterances 115 and the order context 120 (e.g., contextual language information and current cart information up to a given point time) are encoded (e.g., into the utterance vector 212) to provide the cart delta vector 216

(e.g., a delta relative to the cart 126) as well as the next predicted dialog response 220. The cart delta vector 216 identifies the steps to update the cart 126. The codified delta over the cart indicates the steps to update the cart 126 and is the label that the human operator creates when handling the conversation that afterwards becomes the training dataset. For example, the encoder 210 is able to associate a specific utterance of the utterances 115, such as "I want chicken wings", with a specific action, e.g., entering a chicken wing order into the cart 126. The encoder 210 predicts what items should be added to the cart 126 (e.g., based on the action associated with the utterance) and which items should be removed from the cart 126, and any associated quantities. In some aspects, the encoder 210 may use a multi-label classifier, such as for example, decision trees, k-nearest neighbors, neural networks, or the like. In a multi-label classifier, modifiers may include, for example, half-pepperoni, half-sausage, double cheese, and the like. In some cases, the order may use hierarchical structures, with each particular type of order, such as pizza, wings, taco, or the like, at a highest level and modifiers at a lower level in the hierarchy. For example, pizza may be at the highest level while half-pepperoni, half-sausage, double cheese, and the like may be at a lower level. In other cases, the order may use a flat system with every possible combination as a unique item. For example, (a) half-pepperoni may be a first item, (b) half-sausage may be a second item, (c) double cheese may be a third item, (d) half-pepperoni and half-sausage may be a fourth item, (e) half-pepperoni, half-sausage, and double cheese may be a fifth item, and so on.

The intent classifier 213 takes the utterance vector 212 as input and creates an intent vector 242 that represents intent(s) 244 of the utterances 115. Thus, the intent classifier 213 creates the intent vector 242 that is a representation of the customer's intent in the utterances 115. The intent vector 242, along with the utterance vector 212, is used by the dialog model 218 to determine the dialog response 220. The dialog model 218 uses the utterance vector 212 and the intents 244 to create the dialog response 220. The dialog model 218 predicts the dialog response 220, the response that the software agent 116 to the utterance 115. In contrast, in a conventional voice-response system, the system uses a finite state machine. For example, in a conventional system, after each utterance, the system may ask for a confirmation "Did you say 'combo meal'? In the system of FIG. 2, a predictive model predicts the dialog response 220 based on the utterance 115 and the order context 120.

The dish classifier 214 predicts which items from the menu 140 the customer 142 is ordering and modifies the cart 126 accordingly. For example, in the utterance "Can I have 2 pizzas with pepperoni, 6 chicken wings, but no salad", the dish classifier 214 determines which parts of this utterance refers to pizza. The dish classifier 214 model understands the history, e.g., there is a salad already in the cart (e.g., because it is included with chicken wings), and predicts the cart delta vector 216 to reflect how many pizzas and how many wings are there in the cart 126. The prediction of the dish classifier 214 indicates what is being added to and what is being deleted from the cart 126. Thus, based on the utterances 115 and the order context 120, the NLP pipeline 112 predicts the cart 126 and the dialog response 220. One or more of the classifiers 213, 214, 218 may use multiclass classification, a type of support vector machine. The intent classifier 213 determines intent(s) 244 of the utterances 115, e.g., is the intent 244 a menu-related question (e.g., "What toppings are on a Supreme pizza?" or a modification ("I'd link a large pepperoni pizza") to the cart 126.

In some aspects, the menu 140 of the restaurant 132 of FIG. 1 may be represented as an ontology 250 (e.g., a set of menu items in the menu 140 that shows each menu item's properties and the relationships between menu items). In some aspects, the ontology 250 may be represented in the form of a vector. e.g., each type of pizza may have a corresponding vector representation. In some aspects, the menu representations may be generated from unlabeled data, to enable the NLP pipeline 112 to handle any type of information related to ordering, dishes, and food items.

The utterances 115 are used as input to the NLP pipeline 112. The utterances 115 may be in the form of a concatenated string of a set of previous utterances. The amount of utterances 115 provided to the NLP pipeline 112 may be based on how much latent knowledge of the conversation state 226 is desired to be maintained. The greater the amount of utterances 115, the better the conversation state 226. The utterances 115 may be a word, a phrase, a sentence, or multiple sentences (including incomplete sentences) that the customer 142 provides to the software agent 116 at each turn in the conversation. For example, an example conversation may include:

<agent>"Welcome to XYZ, how can I help you?"
<customer>"I'd like to order a large pepperoni pizza."
<agent>"Got it. We have a promotion going on right now where you can get an extra-large for just two dollars more. Would you be interested in getting an extra-large?" (end of turn 1)
<customer>"Okay, give me an extra-large pepperoni."
<agent>"Got it. Would you like anything to drink?" (end of turn 2)
<customer>"Two bottles of water please."
<agent>"Got it. Anything else I can get for you? Dessert perhaps?" (end of turn 3)
<customer>"No. That will do it."
<agent>"Did you want this delivered or will you be picking up?" (end of turn 4)
<customer>"Pickup."
<agent>"Got it. Your total is $20.12. Our address for pickup is 123 Main Street. How would you like to pay?" (end of turn 5)
<customer>"Here is my credit card information <info>."
<agent>"Thanks. Your order will be ready in 20 minutes at 123 Main Street." (end of turn 6)

In this conversation, the customer may be initiating the order from home, may be at a drive-through, or may be talking to an automated (e.g., unmanned) kiosk in the restaurant. There are a total of 6 turns in this example conversation, starting with "I'd like to order a large pepperoni pizza", with each turn including the customer's utterances 115 and the agent's response 220. The utterances 115 may thus include multiple sentences. In some aspects, chunking splitting may be performed, resulting in more than one representation corresponding to a unique utterance from the user. In some cases, the audio of the utterances 115 may be used as input, providing complementary features for emotion recognition, estimation of willingness to talk to AI, or for tackling issues as sidebar conversations. The satisfaction estimation based on vocal features also serves as a signal for optimizing the dialog policy.

The interaction history 222 includes contextual language information, such as, for example, the N previous utterances of the customer (N>0), the M previous responses from the software agent 116 (M>0). The cart state 224 includes current cart information. In some cases, a domain specific ontology 250 may be added as semantic representation of items in the knowledge base (e.g., the conversation data 136). The ontology 250 allows the encoder 210 to identify specific entities with which to select the correct modification to operate on the cart 126. The ontology 250 may be used to facilitate the onboarding of new items or whole semantic fields, alleviate the need for annotated data for each label (e.g., the entries of the employee into the EA-POS 102), and improve the performance of the NLP pipeline 112.

The encoder 210 creates the cart delta vector 216 that includes corresponding actions to update the cart 126 based on the most recent (e.g., latest turn) of the utterances 115. The cart delta vector 216 may be a vector, e.g., a sparse array of numbers that corresponds to a state difference. For example, for a cart that includes "Large Pepperoni Pizza", "2 Liter Coke" and "Chicken Salad", if the most recent utterance is "A large coke, but remove the salad", then the encoder 210 may output [0, 1, −1]. In this way, both the quantity and the intent to remove are encompassed.

The encoder 210 determines the utterance vector 212, a numerical representation of each input (e.g., the utterances 115 and the order context 120) based on the language model 232. The utterance vector 212 is a type of encoding, e.g., a set of symbols that represent a particular entity. For example, in some aspects, the encoding may be an array of real numbers, a vector (or a higher dimensional extension, such as a tensor), that is generated by a statistical language model from a large corpus of data. In addition to using the conversation data 136, the encoder 210 may leverage an additional corpus of data on multiple sites 234 (e.g., Wikipedia and the like), such as food-related sites, thereby enabling the encoder 210 to engage in specialized conversations, such as food-related conversations. In some cases, the encoder 210 may be trained to engage in conversations associated with a particular type of restaurant, e.g., a pizza restaurant, a chicken wings restaurant, a Mexican restaurant, an Italian restaurant, an Indian restaurant, a Middle Eastern restaurant, or the like.

The dish classifier 214 may predict the cart delta vector 216 by passing the encoded representations in the utterance vector 212 through additional neural dialog layers for classification, resulting in a sparse vector that indicates the corresponding element(s) within all possible cart actions, e.g., a comprehensive array of labels of possible combinations. The classifiers 213, 214, 218 may be trained using the conversation data 136. The ontology 250 provides information to precise the modifiers, relating cart actions that are highly related such as adding two different variations of the same dish.

The utterances 115 (e.g., representations of the conversation 111 of FIG. 1), along with the order context 120, may be used as the input to the encoder 210 to determine a particular one of the dialog policies 236 to select the next predicted response 220 of the software agent 116. Each particular one of the dialog policies 236 may be used to predict an appropriate response 220 from multiple candidate responses 238. In some cases, the dialog model 218 may use policy optimization with features such as emotion recognition, total conversation duration, or naturalness terms. The dialog response 220 may be fed back to the dialog model 218 as contextual information. In some cases, multitask learning algorithms that combine more than one similar task to achieve better results may be used with the encoder 210 to enable the encoder 210 to learn important aspects of language modeling that serve indirectly to the final downstream task, while allowing a controlled training process via the design of the learning curriculum. The multiple and auxiliary objective functions serve to leverage more error signals during training, and make the model learn proper representations of the elements involved. Semantic and structural information about the menu 140 is encoded into the ontology 250 and used to inform the later layers of the cart prediction system (e.g., dish classifier 214).

In some cases, curriculum learning may be used to design the order with which tasks of different types or complexity are fed to the encoder 210, the dish classifier 214, the intent classifier 213, the dialog model 218, or any combination thereof, to assist tackling different tasks or to perform prolonged training. In addition, to improve extended training processes, the systems and techniques described here may use continual learning, in which the encoder 210, the dish classifier 214, the intent classifier 213, the dialog model 218, or any combination thereof, are retrained as new conversation data is accumulated. In some cases, the continual learning may be performed with elastic weight consolidation to modulate optimization parameters. For example, continual learning along with incremental learning may be used for new classes, e.g., new dishes, sequentially adding them to the objective though training the same model. Curriculum learning is the process of ordering the training data and tasks using logic to increase the improvement on the later, objective tasks. For example, the first training may include auto-regressive loss, then sentence classification, and then a more complex task. In this way, the model may be incrementally improved instead of tackling directly a possibly too complex task. One or more of the machine learning models (e.g., 210, 213, 214, 218) in the NLP pipeline 112 may be re-trained using newly gathered conversation data 136. For example, the retraining may be performed to improve an accuracy of the machine learning models, to train the models for additional products (e.g., a pizza restaurant adds chicken wings) or additional services (e.g., a pandemic causes the introduction of curbside service as a variation of takeout). The retraining may be performed periodically (to improve accuracy) or in response to the introduction of a new product or a new service.

Figure 3:
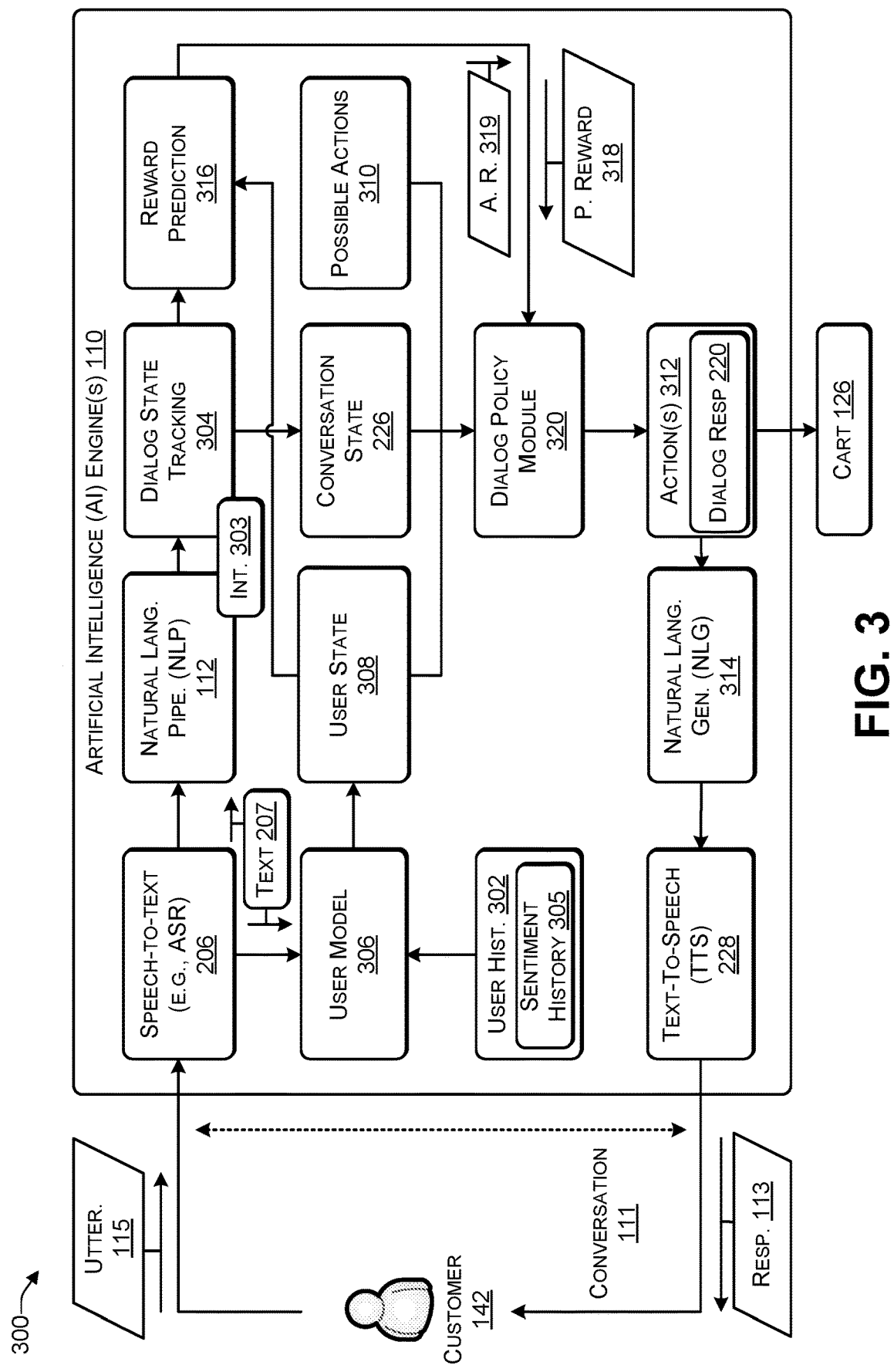
FIG. 3 is a block diagram that includes an AI engine to adaptively modify responses while interacting with a customer, according to some embodiments.

FIG. 3 is a block diagram 300 that includes an AI engine to adaptively modify responses while interacting with a customer, according to some embodiments. The conversation 111 between the customer 142 and the representative AI engine(s) 110 may include utterances 115 from the customer 142 and one or more responses 113 of the AI engine(s) 110. The AI engine(s) 110 may include multiple artificial intelligence engines (e.g., machine learning algorithms), as described herein.

The AI engine(s) 110 may receive the utterances 115 and use the speech-to-text module (ASR) 206 to convert the utterances 115 to the text 207 that is sent to the natural language pipeline (NLP) 112 and to a user model module 320. The NLP 112 determines an intent of the customer 142, e.g., determines what the customer is attempting to accomplish. For example, the NLP 112 may determine whether the intent of the utterances 115 is to order a new item, edit an existing item (e.g., an item that is already in the cart 126 of FIG. 1), accept or reject a recommendation made by the AI engine(s) 110, or the like.

The NLP 112 may provide a customer intent 303 to a dialog state tracking (DST) module 304. The customer intent 303 may include, for example, initiate an order, add an item to the cart, delete an item from the cart, modify an item in the cart (e.g., add/delete pizza toppings and the like), ask for more information about a menu item, pay for the order (e.g., indicating that the order is complete), and the like. The dialog state tracking module 304 keeps track of a current dialog state by updating the dialog state based on the output of the NLP 112. The DST module 304 may encode the current dialog state to indicate whether the state is an order context, a selling context, an address context, a payment context, or the like.

The DST module 304 may provide the current dialog state to a conversation state module 226. The conversation state module 226 may create a representation of the current dialog state (e.g., provided by the DST module 304). The representation of the current dialog state may include information associated with the conversation up to a current point in time. The representation of the current dialog state is used as one of the inputs to the AI engine(s) 110 to select a next action (e.g., update the cart, provide clarification of a menu item, provide an upsell recommendation, or the like).

The speech-to-text (ASR) module 206 may convert the utterances 115 into the text 207 and provide the text 207 to the user model 306. The user model 306 may be created based on the text 207, the utterances 115, and a user history 302 (including sentiment history 305), if available. For example, the AI engine(s) 110 may determine an identity of the customer 142 using facial recognition, voice recognition, vehicle recognition, device recognition (e.g., based on an International Mobile Equipment Identity (IMEI), internet protocol (IP) address, serial number, device identifier, or the like associated with the customer device 104), login information, or other technique and determine the user history 302 (e.g., including order history, preferences such as gluten-free, vegetarian, and the like). The sentiment history 303 may indicate the emotional state of the customer 142 at each turn in the conversation 111. One of the goals of the AI engine(s) 110 may include causing the customer 142 to have a positive emotional state in as many turns of the conversation 111 as possible. The user history 302 may be implemented as a database that includes each customer's order history, conversation history, user feedback (e.g., user ratings of food items and of restaurant), sentiment history 305, and the like. The user model module 306 determines (e.g., selects) a user model for the customer 142 based on the utterances 115, the conversation 111, and the like. The user model for the customer 142 may be used to select a user state 308 that indicates whether the customer 142 has provided one or more indications of urgency, one or more indications of cost sensitivity, and the like. The user model 306 may determine (e.g., select) a model associated with the customer 142 that includes an urgency level of the customer 142, an emotion associated with the customer 142, a number of interruptions performed by the customer 142, and a comfort level conversing with an AI. The urgency level may be selected from two (e.g., urgent or not urgent) or more (e.g., low, medium, high, unknown) levels. The emotion associated with the customer 142 may be positive (e.g., happy), negative (e.g., unhappy), or neutral. The emotion of the customer 142 may be noted at each turn in the conversation to create a sentiment history. One of the goals of the AI engines 110 is to change any negative emotion to a positive emotion and maintain the positive emotion for a remainder of the conversation 111. The number of interruptions performed by the customer 142 may be low (e.g., less than X, X>0), medium (e.g., greater than X but less than Y, X>0, Y>1), or high (e.g., greater than Y, Y>1). The comfort level conversing with an AI may be low (e.g., customer is provided guidance at nearly every step, e.g., "You can say things like 'I want to order a medium pizza and list the toppings'"), medium (e.g., customer is occasionally provided guidance), high (e.g., customer is not provided guidance), or unknown. The user model 306 may use machine learning and/or deep learning such as a multitask classification model based on supervised training data that is collected using a loop/feedback mechanism, the conversation data 136, and the like.

The user state 308, the conversation state module 226, and possible actions 310 may be provided as input to a dialog policy module 320. The possible actions 310 include possible actions that can be taken by the AI engine(s) 110, such as, for example, modifying the cart 126, confirming a request to modify the cart 126, clarifying a menu item, providing one or more recommendations (e.g., upselling), or the like. The dialog policy module 320 may use the user state 308 and the conversation state 226 to select one or more (next) actions 316 from the possible actions 310. For example, given the conversation state 226 and the user state 308, there may exist a finite number of actions from the possible actions 310 that can be selected. The dialog policy module 320 may determine which actions 312 are selected from the possible actions 310. The actions 312 may include the dialog response 220 to provide to the customer 142, one or more actions to be performed to the cart 126 (e.g., add to the cart, delete from the cart, modify an item in the cart, request payment, initiate order fulfillment, and the like). The dialog policy module 320 may include a reinforcement learning-based module that takes an environment state (e.g., the conversation state 226 and the user state 308) as input along with a set of possible actions 310. For the current environment state and the set of possible actions 310, the dialog policy module 320 learns rewards, such as a reward 318 provided by a reward prediction module 316 and predicts one or more actions 312 that have a highest possible potential reward (e.g., using an epsilon greedy random algorithm) most of the time but randomly selects the actions 312 some of the time (e.g., even when the actions 312 that might not provide the highest potential reward given current learnt values). The epsilon-greedy random algorithm picks a current best option ("greedy") most of the time and picks a random option with a small (epsilon) probability at other times.

The dialog policy module 320 may use deep reinforcement learning (RL) where a policy is a prediction that is modeled as a single class classification problem to predict one or more of the actions 312 based on the inputs (e.g., the user state 308, the conversation state 226, and possible actions 310). The actions 312 may be predicted randomly from the possible actions 310 with a probability of epsilon for the model to explore and select the predicted actions 312. The dialog policy module 320 may be trained using supervised training algorithms based on human and/or machine annotated data. At runtime, mini-batches of training data may be created based on state-action pairs along with actual reward 319 and used to retrain (e.g., fine tune) the dialog policy module 320.

The dialog policy module 320 may use the user state 308 and the conversation state 226 as inputs. The user state 308 is the output of the user model 306 and models the customer 142 (e.g., urgency, comfort level conversing with an AI, cost sensitivity, and the like). The reward 318 may be positive, negative, or neutral. A positive reward may be provided when the customer 142 accepts a recommendation, does not ask for clarification, indicates an improved emotion (e.g., uses positive and/or words of excitement), or the like. A negative reward may be provided when the customer 142 rejects a recommendation, asks for clarification, uses negative words, or the like. A neutral reward may be provided for all other cases. The dialog policy module 320 may use a supervised learning model that is based on pre-defined user models, pre-defined user states, and pre-defined conversation states.

The actions 312 associated with the dialog response 220 are sent to a natural language generation 314 module to generate a natural language response which is sent to the text-to-speech (TTS) module 228 to generate the (audible) response 113 that is provided (e.g., via a speaker or other transducer) to the customer 142 as part of the conversation 111. The customer 142 provides a next of the utterances 115 and the AI engine(s) 110 processes the next utterances 115 as described herein. Based on the new customer input (e.g., the next utterances 115) and the previous action predicted by the AI engine(s) 110, the actual reward 319 for the previous actions 312 is calculated by the reward prediction module 316. For example, if the actions 312 predicted by the dialog policy module 320 is a recommendation and the customer 142 accepted the recommendation (e.g., in the next utterances 115), then the reward 319 is positive. If the actions 312 predicted by the dialog policy module 320 is a recommendation that the customer 142 rejected (e.g., in the next utterances 115), then the reward 319 is negative. If the customer 142 requests a human agent, then the reward 319 is negative. The dialog policy module 320 uses the reward 318, the user state 308 state, the conversation state 226, and the previously predicted actions 312 to learn and adjust the policy prediction during runtime, in real-time. the AI engine(s) 110 may determine an actual reward 319 based on the utterances 115, text 207, user state 308, and conversation state 226. To illustrate, the dialog policy module 320 may provide the response 113 (e.g., an upsell suggestion) based, in part, on the predicted reward 318. The utterance 115 that is provided after the response 113 is used to determine the actual reward 319. For example, if an upsell suggestion in the response 113 was accepted, then the actual reward 319 is positive and if the upsell suggestion was rejected, the actual reward 319 is negative. The dialog policy module 320 may use the actual reward 319 to modify (e.g., retrain) the AI engine(s) 110. For example, if the customer 142 rejects a recommendation, then the AI engine(s) 110 may receive the negative reward 319 and learns from the negative reward 319. To illustrate, if the customer 142 rejects a high-priced recommendation, then the dialog policy module 320 may provide a lower-priced recommendation, modify the user model 306 to a different model that indicates that the customer 142 is price-sensitive, or both.

Prior to being deployed with customers, the dialog policy module 320 is trained in a simulated environment that includes simulated conversations (e.g., based on the conversation data 136 of FIG. 1, conversations created by humans, conversations generated by machine learning or any combination thereof). After being deployed at a restaurant to converse with customers, the dialog policy module 320 learns using real experiences, as illustrated in FIG. 3. Thus, the dialog policy module 320 learns from both simulated experiences and real experiences.

Figure 4:
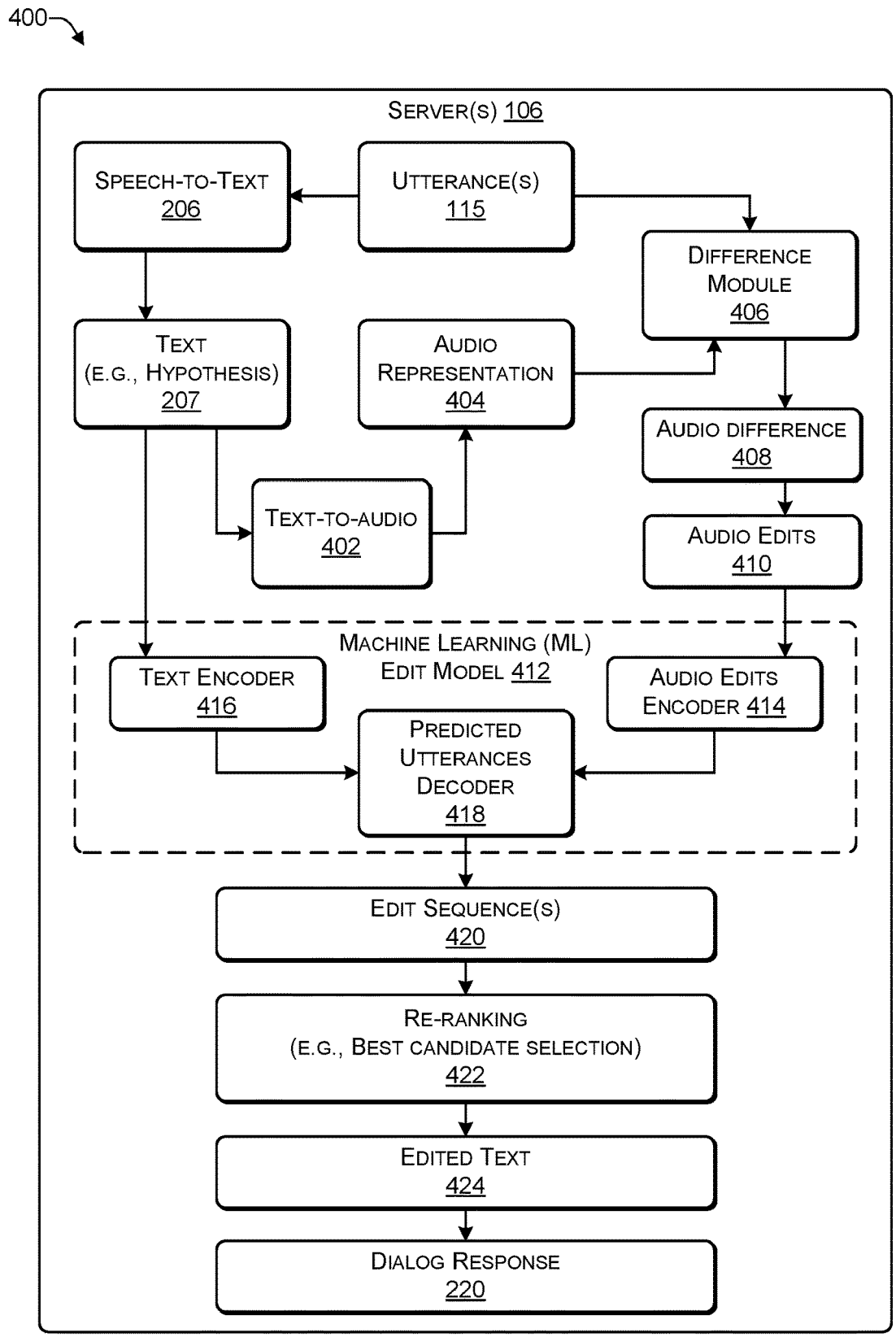
FIG. 4 is a block diagram that includes a machine learning algorithm to modify a text-based representation of one or more utterance(s), according to some embodiments.

FIG. 4 is a block diagram 400 that includes a machine learning algorithm to modify a text-based representation of one or more utterance(s), according to some embodiments. The utterances 115 are converted to the text 207 using the speech-to-text 206 module. For example, the speech-to-text 206 module may use automatic speech recognition (ASR) or a similar technology to transcribe the utterances 115 (e.g., raw audio data) into the text 207.

A text-to-audio 402 module converts the text 207 into an audio representation 404. As a first example, the audio representation 404 may be created using a text-to-speech module, e.g., that pronounces the words in the text 207. As a second example, the audio representation 404 may be a spectrogram, with frequencies on a vertical (e.g., y) axis and time on a horizontal (e.g., x) axis. To illustrate, the audio representation 404 may be a representation of the spectrum of frequencies of the utterances 115 (e.g., in the time frame in which the utterances 115 occurred). The spectrogram may also be referred to as a sonograph, a voiceprint, or a voicegram. As a third example, the audio representation 404 may be a phoneme vector, e.g., a vector that includes multiple phonemes used to phonetically pronounce the text 207, e.g., wav2vec.

A difference module 406 may determine audio differences 408 between the utterances 115 and the audio representation 404, e.g., using one or more of a text-to-speech of the text 207, a spectrogram of the text 207, a phoneme vector, or any combination thereof. For example, when using spectrograms, the difference module 406 may determine mel frequency cepstral coefficients (MFCCs) between the utterances 115 and the audio representation 404. Based on the audio differences 408, the server 106 may determine zero or more audio edits 410 to edit the text 207 to more closely match the utterances 115. For example, the text 207 may include "pan tossed crust" and the audio edits 410 may edit the text 207 to create "hand-tossed crust".

The audio edits 410 may be provided to a machine learning edit model 414. The text 207 is treated as a hypothesis and provided as input to a text (e.g., hypothesis) encoder 416. The audio edits 410 are provided as input to an audio edit encoder 414. The text (e.g., hypothesis) encoder 416 in the audio edit encoder 414 are used to provide input to a predicted utterances decoder 418. For example, in some aspects, a bidirectional Gated Recurrent Unit (GRU) may be used to implement one or more of: the audio edit encoder 414, the text (e.g., hypothesis) encoder 416, and the predicted utterances decoder 418. A GRU is a gating mechanism in a recurrent neural network, similar to a long short-term memory (LSTM) with a forget gate, but with fewer parameters than the LSTM, because the GRU lacks an output gate.

The predicted utterances decoder 418 outputs in edit sequence 420. The edit action sequence 420 includes a sequence of edit actions to be performed to the text 207 to address the audio differences 408 between the utterances 115 and the audio representation 404. A re-ranking module 422 may perform a best candidate selection to create edited text 424. The edited text 424 may be output as the dialog response 220. Examples of edit commands in the edit sequence 420 are described in more detail in FIG. 7 (replace), FIG. 8 (insert), and FIG. 9 (delete).

> The re-ranking module 422 determines a weighted sum=[1st weight ($W_1$)]×beam score+[2nd weight ($W_2$)]×similarity measure+[3rd weight ($W_3$)]×generation likelihood The beam score is a score that is proportional to a probability of a particular edit action sequence. The similarity measure is a measure of a difference between the text 207 and an edited result of a particular edit sequence predicted by the ML edit model 414. The larger the similarity measure, the smaller the differences. The similarity measure may, for example, be expressed using a Jaccard index, a Tanimoto index, or the like. The generation likelihood is larger when the edited transcription is more likely to be inferred from the utterances 115 (e.g., the original audio).

For example, assume the text 207="half half pepperoni".
Candidate 1:
Edit_actions_1=<DeleteOldKeepBefore>half    half, <DeleteNewKeepBefore>half,
<DeleteEnd>
Edited_transcription_1="half pepperoni"

Beam_score_1=0.3
Similarity_score_1=2
Generation_score_1=0.01
Candidate 2:
Edit_actions_2=<InsertOldKeepBefore>half half, <InsertNewKeepBefore>half cheese half, <InsertEnd>
Edited_transcription_2="half cheese half pepperoni"
Beam_score_1=0.7
Similarity_score_1=1
Generation_score_1=0.005

In this example, the re-ranking module 422 determines:
candidate_1=(0.3×W$_1$)+(2×W$_2$)+(0.01×W$_3$)=A
candidate_2=(0.7×W$_1$)+(1×W$_2$)+(0.005×W$_3$)=B If A>=B, then the re-ranking module 422 selects candidate_1. If A<B then the re-ranking module 422 selects candidate_2.

Figure 7:
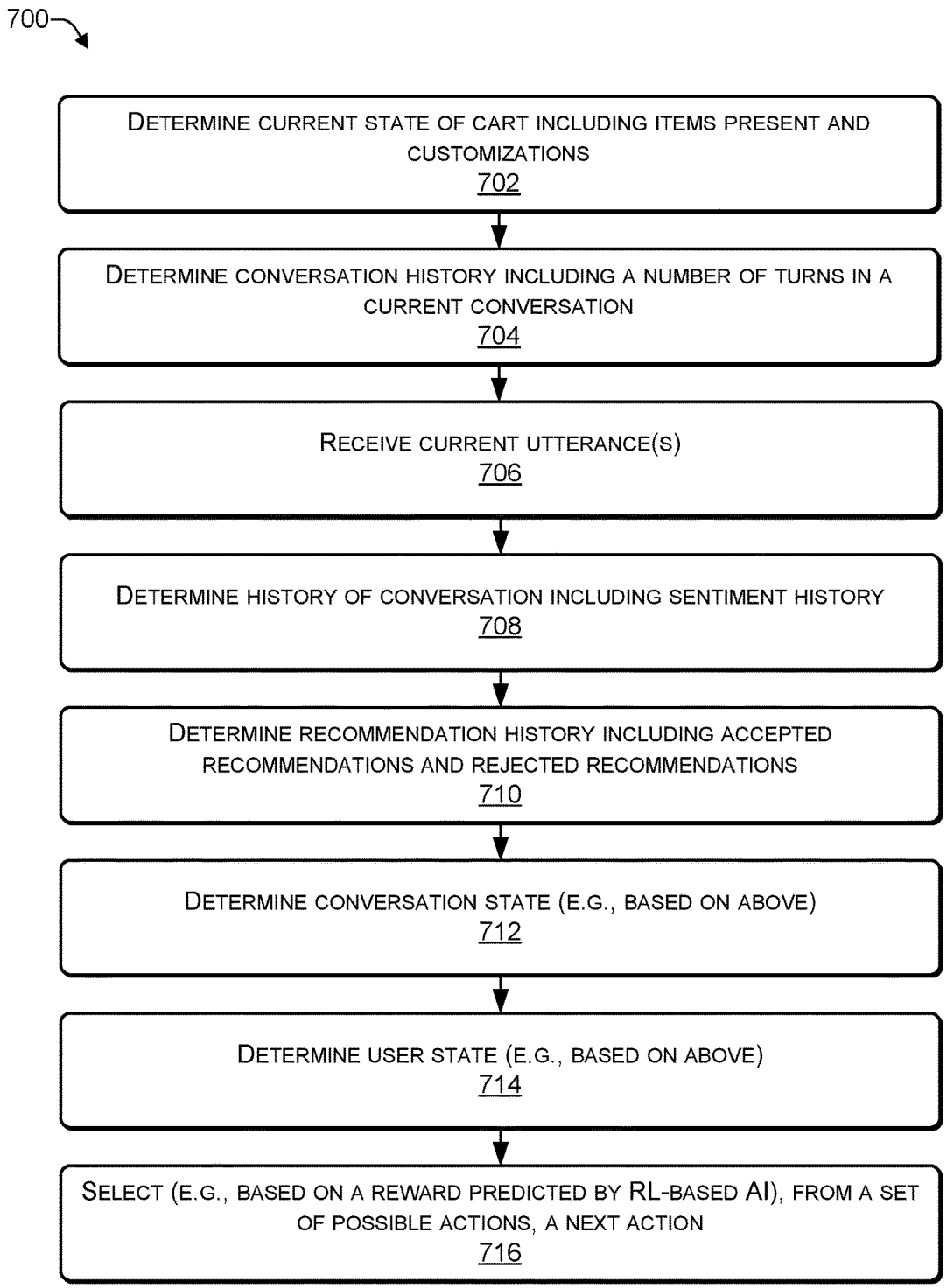
FIG. 7 is a flowchart of a process that includes selecting a next action from a set of possible actions, according to some embodiments.

Thus, the system of FIG. 4 is used to edit the text 207 to create the edited text 424. The speech-to-text 206 module uses automatic speech recognition (ASR) to output the text 207, e.g., a hypothesis of the utterances 115. The purpose of the system of FIG. 7 is to have the edited text 424 approach (e.g., become nearly identical to) the utterances 115. The edited text 424 (e.g., edited hypothesis) is created by using the edit sequence 420 (e.g., replace, insert, delete) to apply a set of edit actions to remove errors (e.g., ASR errors) from the text 207. Thus, the edited text 424 is a function (F) of the text 207 and the edit sequence 420:

F((text 207), (edit sequence 420))=edited text 424

To determine the edit sequence 420, the audio representation 404 is created based on the text 207. The audio representation 404 encodes (in an audio format) what the text 207 (e.g., the ASR hypothesis) sounds like. The audio representation 404 enables the difference module 406 to determine the audio differences 408 between the utterances 115 and the audio representation 404. The audio differences 408 between the utterances 115 and the audio representation 404 represents the difference between the hypothesis (e.g., text 207) and what was received (e.g., the utterances 115). After determining the audio differences 408, the system of FIG. 7 determines edit sequence 420 that is used to edit the text 207 to create the edited text 424, where the edited text 424 is closer to the utterances 115 than the text 207.

Thus, the text 207 (hypothesis) may have one or more incorrect words that are plausible in the context of the other words in the text 207. For each incorrect word identified in the text 207, one or more other words may be equally likely. Additional context information is used to identify and correct the incorrect words. The additional context in FIG. 7 is the audio information, in the form of the audio representation 404 that is used to determine the audio differences.

In cases where there are multiple candidates, the re-ranking 422 may be performed to adjust for multiple candidates, as illustrated in the example above with candidate_1 and candidate_2. Thus, the ML edit model 414 may generate multiple edit sequences 420, thereby generating multiple candidate edited-transcriptions. The re-ranking module 422 then selects the best candidate from a set of candidate edited-transcriptions using the weighted sum, as described in the example above. An advantage of the techniques described herein (e.g., as compared to purely text-based techniques) is that by accessing the audio differences 408, differences in the pronunciation of words that are errors generated by the speech-to-text 206 (ASR) may be identified. The audio representation 404 may be generated using a text-to-speech mechanism, a spectrogram or a phoneme vector (e.g., text to audio mapping).

Depending on the type (e.g., audio representation 404 of the output of speech-to-text 206, a spectrogram or a phoneme vector) of the audio representation 404, the difference module 406 may use an appropriate technique to determine the audio differences 408. For example, when comparing two audio files (e.g., of 115 and 404), two audio frames are compared, with each audio frame represented as a vector of number. The audio differences 408 may be a difference vector between the two vectors that represent the two audio frames. As another example, when comparing two spectrograms (e.g., of 115 and 404), the audio differences 408 may include differences between frequencies in each audio frame. As yet another example, when comparing two embeddings, the audio differences 408 may include the differences between each embedding. Each audio file can be represented as an arbitrarily large vector space. The vector space is constructed using a machine learning algorithm that learns to map the audio or spectrogram to a fixed-sized vector space. The resulting model generates a 1-to-1 mapping from a given audio or spectrogram to the vector space, called the embedding. Two different audio files will not share the same embedding. The embedding is designed such that differences between two audio files (or two spectrograms) expressed in the embedding has a significant interpretation. For example, the differences between two audio files in the embedding used by the systems and techniques described herein may roughly equal the differences between phonemes in the audio files. In this way, equal phonemes cancel each other out and what remains, are different phonemes that are components of different words.

The text (e.g., hypothesis) encoder 416 may be implemented using any type of sequence encoder. In some aspects, the text (e.g., hypothesis) encoder 416 is implemented using a bi-directional GRU. The audio edit encoder 414 may be implemented using any type of sequence encoder. In some aspects, the audio edit encoder 414 is implemented using a bi-directional GRU. The predicted utterances decoder 418 may be implemented using any type of decoder of edit actions, such as a GRU. The data used to train the ML edit model 414 may include audio (e.g., .wav file) of the utterances 115 of multiple customers, the text 207 (e.g., the output of the speech-to-text 206 module), and the edited text 424.

The audio edits 410 are used to create the edit sequence 420, e.g., a sequence of edit actions, such as insert, delete, replace, and keep that are applied to the text 207 to correct errors to create the edited text 424. For example, edit actions Insert, Delete and Replace may be structured as:

<Action>[span of tokens]<ActionEnd>

Because replace simultaneously adds and removes content, replace may have a slightly different structure:

<ReplaceOld>[Span of old tokens]<ReplaceNew>[Span of new tokens]<ReplaceEnd>

Keep is done implicitly, to enable the edit model 414 to learn what tokens to change, thereby simplifying the edit actions to be performed. The edits are placed in the correct positions using "anchors", e.g., a minimum number of words that identify a unique position in the sentence. For example, the span of tokens used with ReplaceOld, InsertOld, and DeleteOld may be unique across the text 207 and uniquely identify each edit location. The edit model 414 may iteratively search through unchanged tokens in the text 207 before and after the span, incorporating additional tokens into the span, until the span becomes unique. The added tokens are included in both components of the action. For instance, if the last A is to be replaced with C in ABA, the ReplaceOld span is BA and the ReplaceNew span is BC.

ABA→<ReplaceOld>BA<ReplaceNew>BC<ReplaceEnd>→ABC

The edit types may be augmented to differentiate between various scenarios that may arise from the iterative search.

For example, besides Replace, edit actions ReplaceKeepBefore and ReplaceKeepAfter may be used to indicate that an edit action includes retaining some content before or after, respectively. For similar reasons, the edit actions InsertKeepBefore, InsertKeepAfter, DeleteKeepBefore, and DeleteKeepAfter may be used.

In the flow diagrams of FIGS. 5, 6, 7, and 8, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 500, 600, 700, and 800 are described with reference to FIGS. 1, 2, 4, and 4 as described above, although other models, frameworks, systems and environments may be used to implement this process.

FIG. 5 is a flowchart of a process 500 that includes determining a reward and adjusting an AI, according to some embodiments. The process 500 may be performed by the AI engine(s) 110 of FIGS. 1, 3, and 4.

At 502, the process may receive one or more utterances from a customer. At 504, the process may convert the utterances to text using automatic speech recognition (ASR). For example, in FIG. 3, the AI engine(s) 110 may receive the utterances 115 and convert the utterances to the text 207 using the speech-to-text (e.g., ASR) 206.

At 506, the process may determine an intent using a natural language pipeline (NLP). At 508, the process may update a conversation state based on the intent. At 510, the process may select a user model based on the utterances, text, conversation state, user history, or any combination thereof. For example, in FIG. 3, the AI engine(s) 110 may determine an intent of the utterances 115 using the NLP 112. The AI engine(s) 110 may select the conversation state 226 based on the intent determined by the NLP 112. The AI engine(s) 110 may select the user model 306 based on the conversation state 226.

At 512, the process may determine a user state based on the user model and a conversation state. At 514, the process may select one or more actions, including a (dialog) response, based on a predicted reward (e.g., predicted by an RL-based AI), the user state, and the conversation state. At 516, the process may generate a response (e.g., using text-to-speech) and provide the generated dialog to the customer. For example, in FIG. 3, the AI engine(s) 110 may determine the user state 308 based on the reward 318 (predicted by the reward prediction 316), the user model 306, and the conversation state 226. The AI engine(s) 110 may select the dialog response 220 based on the reward 318, the user state 308, and the conversation state 226. The AI engine(s) 110 may generate the response 113 based on the dialog response 220 using the natural language generation module 314 and the text-to-speech module 228.

At 518, the process may determine an actual reward (e.g., not the predicted reward) and adjust the AI engine accordingly. At 520, the process may determine whether the utterances indicate an end of the conversation. If the process determines, at 520 that the utterances indicate the end of the conversation, then the process may end. If the process determines, at 520, that the utterances indicate that the conversation has not ended, then the process may proceed back to 502 to receive one or more next utterances. For example, in FIG. 3, the AI engine(s) 110 may determine an actual reward 319 based on the utterances 115, text 207, user state 308, and conversation state 226. To illustrate, the dialog policy module 320 may provide the response 113 (e.g., an upsell suggestion) based, in part, on the predicted reward 318. The utterance 115 that is provided after the response 113 is used to determine the actual reward 319. For example, if an upsell suggestion in the response 113 was accepted, then the actual reward 319 is positive and if the upsell suggestion was rejected, the actual reward 319 is negative. The dialog policy module 320 may use the actual reward 319 to modify (e.g., retrain) the AI engine(s) 110. For example, if the customer 142 rejects a recommendation, then the AI engine(s) 110 may receive the negative reward 319 and learns from the negative reward 319. To illustrate, if the customer 142 rejects a high-priced recommendation, then the dialog policy module 320 may provide a lower-priced recommendation, modify the user model 306 to a different model that indicates that the customer 142 is price-sensitive, or both. The AI engine(s) 110 may determine whether the text 207 derived from the utterances 115 indicates the end of the conversation 111. For example, if the customer 142 says a word or phrase, such as, "That is it", "How much will that be?", or the like, then the AI engine(s) 110 may determine that the customer 142 is ready to check out and will begin a checkout process. As another example, if the customer 142 says a word or phrase, such as, "What dessert items do you have?", "Do you have iced beverages?", or the like, indicating that the customer 142 desires to order additional items or find out more information about the menu, then the AI engine(s) 110 may determine that the customer 142 does not desire to end the conversation 111 and will continue to receive and process a next utterance 115.

Thus, an AI engine may converse with a customer to receive an order and use reinforcement learning to adapt to the customer in real time. Adapting to the customer may include determining whether the customer is in a hurry by (1) determining whether the customer's choice of words indicates urgency, (2) determining whether the customer is cost sensitive based on the customer's choice of words that indicate that the customer has a limited budget or is otherwise price conscious, and (3) determining the customer's comfort level conversing with an AI and adjusting the verbosity of the output such that customers that are comfortable conversing with an AI may receive relatively non-verbose responses from the AI engine while customers that are inexperienced conversing with an AI may receive relatively more verbose responses that include more step-by-step instructions on placing an order with an AI. In this way, the AI is able to adjust to the particular characteristics of a customer in real time, thereby providing a pleasing experience to the customer by adapting to the customer rather than having the customer to adapt to the AI.

Figure 6:
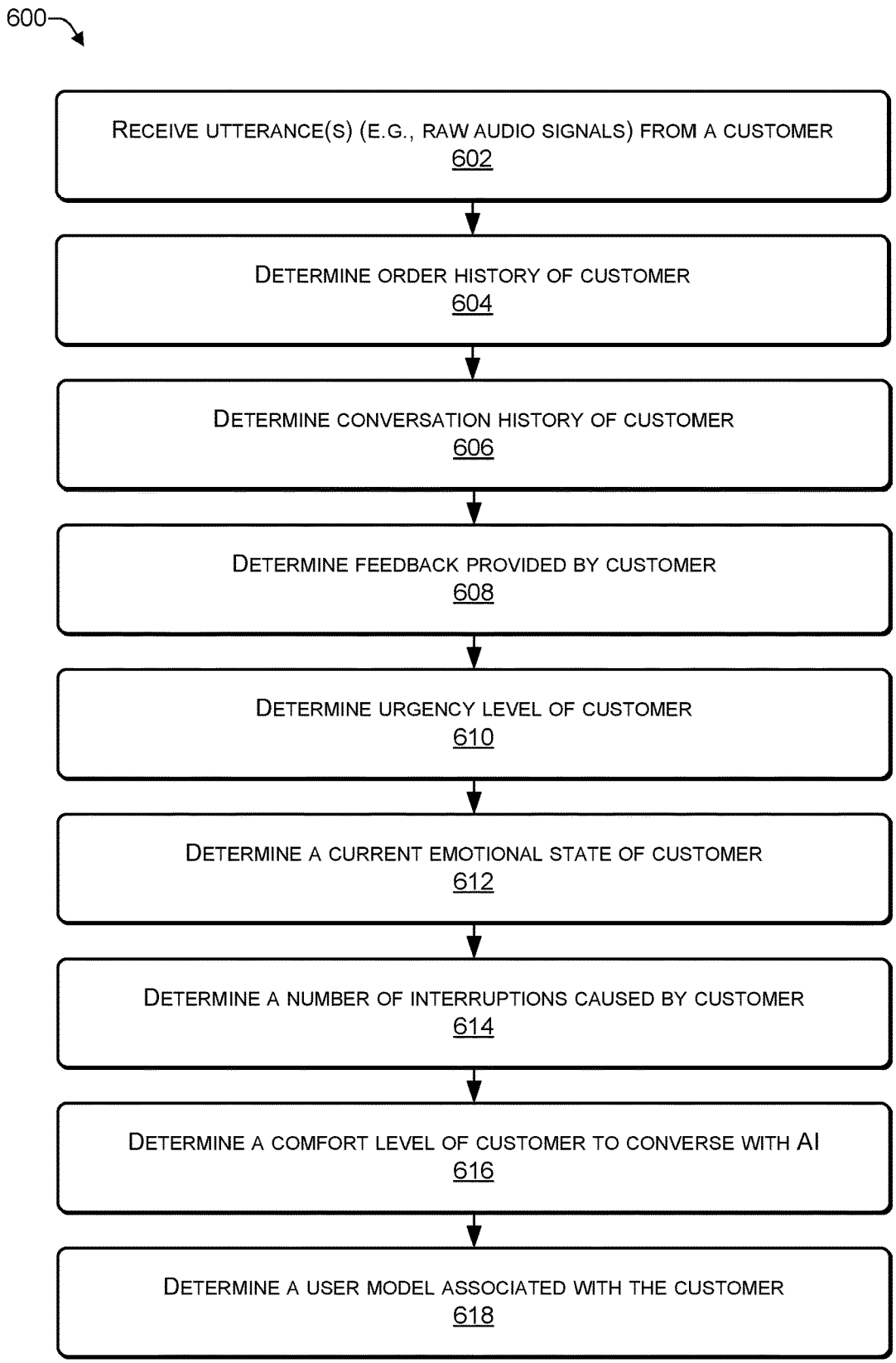
FIG. 6 is a flowchart of a process that includes determining a user model associated with a customer, according to some embodiments.

FIG. 6 is a flowchart of a process 600 that includes determining a user model associated with a customer, according to some embodiments. The process 600 may be performed by the AI engine(s) 110 of FIGS. 1, 3, and 4.

At 602, the process may receive one or more utterances from a customer. At 604, the process may determine an order history of the customer. At 606, the process may determine a conversation history of the customer. At 608, the process may determine feedback provided by the customer. For example, in FIG. 3, the AI engine(s) 110 may receive the utterances 115, convert the utterances 115 to the text 207 using the speech-to-text 206, and determine the user history 302 of the customer. For example, the AI engine(s) 110 may use voice recognition, speech recognition, device recognition, login credentials, or another technique to determine an identity of the customer 142 and retrieve the customer's user history 302. The user history 302 may include a conversation history of the customer 142 including previous conversations with the AI engine(s) 110. The user history 302 may include feedback provided by the customer 142. For example, after placing an order with the AI engine(s) 110, the customer 142 may be provided with a survey to provide feedback. The feedback may include asking the customer 142 whether the AI engine(s) 110 was to verbose or not verbose enough, whether the customer 142 was in a hurry (e.g., urgent) and whether the AI engine(s) 110 was able to discern the urgency of the customer 142, whether the customer 142 was cost-conscious when providing a previous order and whether the AI engine(s) 110 was able to discern that the customer 142 was cost-conscious and provide suitable recommendations.

At 610, the process may determine an urgency level of the customer. At 612, the process may determine a current emotional state of the customer. At 614, the process may determine a number of interruptions caused by the customer. At 616, the process may determine a comfort level of the customer to converse with an AI. At 618, the process may determine a user model associated with the customer. For example, in FIG. 3, the text 207 may be used to select the user model 306 based on the user history 302. The user model 306 may be selected based in part on an urgency level of the customer 142 (e.g., that is determined based on the words in the utterances 115 and the text 207). The user model 306 may be selected based in part on a current emotional state of the customer 142. The emotional state may be determined based on the type of words the customer 142 uses in the utterance 115. For example, if the utterance 115 includes words of anger (e.g., "No! That is not what I said."), frustration (e.g., "Can we move this [order process] along?"), and the like, then the emotional state of the customer 142 may be determined to be unhappy. If the utterance 115 includes words of happiness (e.g., "Yes great recommendation—please add that to my order."), excitement (e.g., "What you describe sounds tasty!"), Or the like, then the emotional state of the customer 142 may be determined to be happy. The user model may be selected in part based on determining a comfort level of the customer 142 in conversing with an AI. For example, the number of pauses in the utterances 115, the length of each pause in the utterances 115, the number of questions asked in the utterances 115, and other information from the utterances 115 may be taken into account to determine the comfort level of the customer 142 in conversing with an AI. The AI engine(s) 110 may use the emotional state, the number of interruptions caused by the customer 142, the comfort level of the customer, and the user history 302 to determine the user model 306.

Thus, after receiving utterances from a customer, an AI may analyze the utterances and a user history to determine an emotional state of the customer, an urgency level of the customer, and a comfort level of the customer to converse with an AI. Based on the emotional state, the urgency level, and the comfort level, the AI may select a user model that reflects the customer's current state. For example, assuming there are 3 emotional states, e.g., positive (e.g., happy), negative (e.g., unhappy), or neutral, there are two urgency levels, e.g., urgent or non-urgent, and three comfort levels, e.g., comfortable, not comfortable, or neutral/unknown. In this example, a total of 18 (=3×2×3) user models are possible. Of course, if the emotional level, urgency level, and the comfort level have a difference number of possibilities, then the total number of user models may differ proportionally. The AI may use the user model, along with a current state of the conversation (e.g., conversation state), to select one or more actions from a set of possible actions.

FIG. 7 is a flowchart of a process 700 that includes selecting a next action from a set of possible actions, according to some embodiments. The process 700 may be performed by the AI engine(s) 110 of FIGS. 1, 3, and 4.

At 702, the process may determine a current state of a cart, including items present and customizations. At 704, the process may determine a conversation history including a number of turns in a current conversation. At 706, the process may determine current utterances. For example, in FIG. 3, the AI engine(s) 110 may determine a current state of the cart 126, including items (e.g., large supreme pizza) that are present and customizations (e.g., double cheese, extra olives) associated with each item. The AI engine(s) 110 may determine the user history 302 including the history of the current conversation 111, including, for example, the number of turns in the conversation 111, the number of times the customer 142 has interrupted the responses 113 provided by the AI engine(s) 110, the number of times the customer 142 has asked for additional information, and the like. The AI engine(s) 110 may receive the current utterances 115 and determine the text 207 content of the utterances 115.

At 708, the process may determine a history of the conversation including a sentiment history. At 710, the process may determine a recommendation history including accepted recommendations (provided by the AI) and rejected recommendations (provided by the AI). For example, in FIG. 3, the AI engine(s) 110 may determine the user history 302 that includes the sentiment history 305 of the conversation 111 and the recommendation history. The sentiment history 305 may indicate the emotional state of the customer 142 at each turn in the conversation 111. One of the goals of the AI engine(s) 110 may include causing the customer 142 to have a positive emotional state in as many turns of the conversation 111 as possible. For example, if the customer 142 indicates a negative emotional state by using words of anger or frustration, then the AI engine(s) 110 may determine one or more actions 312 to change the emotional state to a positive emotional state. The recommendation history in the conversation 111 may include which recommendations that the AI engine(s) 110 made were accepted by the customer 142 and which recommendations were rejected. The acceptance and the rejection of the recommendations may be used to determine the actual reward 319, the urgency level of the customer 142, the price sensitivity of the customer 142, other characteristics of the customer 142, or any combination thereof.

At 712, the process may determine a conversation state (e.g., based on the above). At 714, the process may determine a user state (e.g., based on the above). At 716, the process may select (e.g., based in part on a reward predicted by an RL-based AI) next action(s) from a set of possible actions. For example, in FIG. 3, the AI engine(s) 110 may determine the conversation state 226 based on the information gathered at one or more of 702, 704, 706, 708, 710 or any combination thereof. The AI engine(s) 110 may determine the user state 308 based on the information gathered at one or more of 702, 704, 706, 708, 710, or any combination thereof. The AI engine(s) 110 may use the dialog policy module 322 to select the actions 312 from the possible actions 310 based, in part on the predicted reward 318, the user model 306, the user state 308, and the conversation state 226. For example, the dialog policy module 322 may use a reinforcement learning based AI, such as an epsilon greedy random algorithm, to select a best action ("greedy") most of the time and select a random option with a small (epsilon) probability the remaining times.

Thus, various information associated with a customer, including the current conversation history, previous conversation history, conversation state, user state of a user model associated with the customer, and the like, may be used to select a next action from a set of possible actions. In some cases, an epsilon greedy random algorithm may be used to select a best action ("greedy") most of the time and select a random option with a small (epsilon) probability the remaining times.

Figure 8:
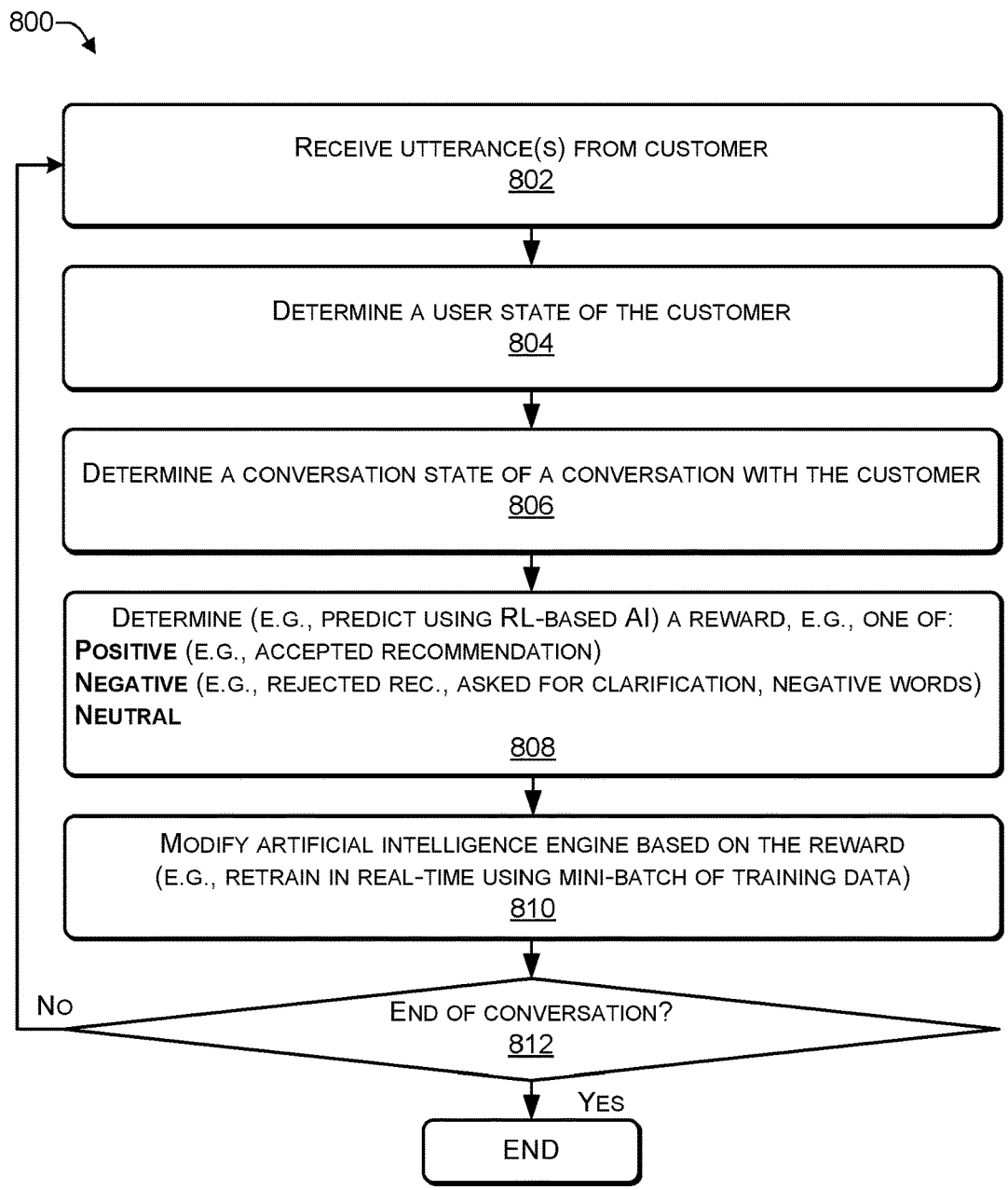
FIG. 8 is a flowchart of a process that includes modifying an AI based on a reward, according to some embodiments.

FIG. 8 is a flowchart of a process 800 that includes modifying an AI based on a reward, according to some embodiments. The process 800 may be performed by the AI engine(s) 110 of FIGS. 1, 3, and 4.

At 802, the process may receive one or more utterances from a customer. At 804, the process may determine a user state of the customer. At 806, the process may determine a conversation state of a conversation with (e.g., between the AI and) the customer. For example, in FIG. 3, the AI engine(s) 110 may receive the utterances 115 from the customer 142 and determine the conversation state 226, e.g., based on the user history and the user state.

At 808, the process may determine a reward. For example, in FIG. 3, the AI engine(s) 110 may use the reward prediction 316 to determine the reward 318. The reward 318 may be one of a positive reward (e.g., because the customer accepted a recommendation, used positive words, or the like), a negative reward (e.g., because the customer rejected a recommendation, asked for clarification, used negative words, or the like), or neutral. Positive words may include, for example, "good", "excellent", "awesome", "interesting", or the like. Negative words may include, for example, "not good", "unappetizing", "unappealing", or the like. Clarification words may include, for example, "Please tell me more about item <item name>", "What is that?", or the like. In some cases, the positive reward may be +5 points, the negative reward may be –5 points, and the neutral reward may be zero. Of course, other reward systems may be used instead of +5/–5/0 to fine tune the AI engine(s) 110.

At 810, the process may modify an artificial intelligence engine based on the reward. At 812, the process may determine whether the utterances include an indication that the conversation is complete. If the process determines, at 812, that the utterances indicate that the conversation is complete, then the process may end the conversation. If the process determines that the utterances indicate that the conversation is incomplete, then the process may proceed to 8022 receive one or more next utterances. For example, in FIG. 3, the AI engine(s) 110 may modify the dialog policy module 320 based on the actual reward 319 as part of the reinforcement learning algorithm by creating a small batch of retraining data and retraining the dialog policy module 320 in real time during the conversation 111 (e.g., before the conversation 111 has ended). In this way (e.g., by retraining the dialog policy module 320), the AI engine 110 is able to adapt, in real time, to the customer 142. For example, the customer 142's user history 302 may indicate that the customer 142 is normally (e.g., >Y % of the time, e.g., Y=80, 90, 95 or the like) not in a hurry. However, if the AI engines 110 determine that utterances 115 indicate urgency, then the dialog policy module 320 may adapt in real time to the customer's urgency by reducing the number of upsell recommendations, reducing a verbosity level, and the like. As another example, the customer 142's user history 302 may indicate that the customer 142 is normally (e.g., >Y % of the time, e.g., Y=80, 90, 95 or the like) in a hurry. However, if the AI engines 110 determine that utterances 115 indicate a lack of urgency, then the dialog policy module 320 may adapt in real time to the customer's lack of urgency by increasing the number of upsell recommendations, increasing a verbosity level, and the like.

Thus, current utterances, a user state, and a conversation state may be used to determine a reward for a reinforcement learning (RL) based AI engine to enable the AI engine to adapt to individual customers in real time. The AI may adapt to a customer that is in a hurry and exhibits urgency in their utterances by being less verbose. The AI may adapt to a customer whose utterances indicate price sensitivity by recommending more inexpensive options (e.g., from a "dollar menu" or similar menu targeting cost sensitive customers). The AI may adapt to a customer whose utterances indicate that the customer is comfortable conversing with an AI by reducing explanatory dialog responses. The AI may adapt to a customer whose utterances indicate that the customer is uncomfortable conversing with an AI by increasing explanatory dialog responses. The AI may adapt to a customer whose utterances indicate that the customer is in a negative emotional state by providing dialog responses to improve change the emotional state from negative to positive. For example, the AI may recommend a coupon, a promotion, or offer a discount on one or more items.

Figure 9:
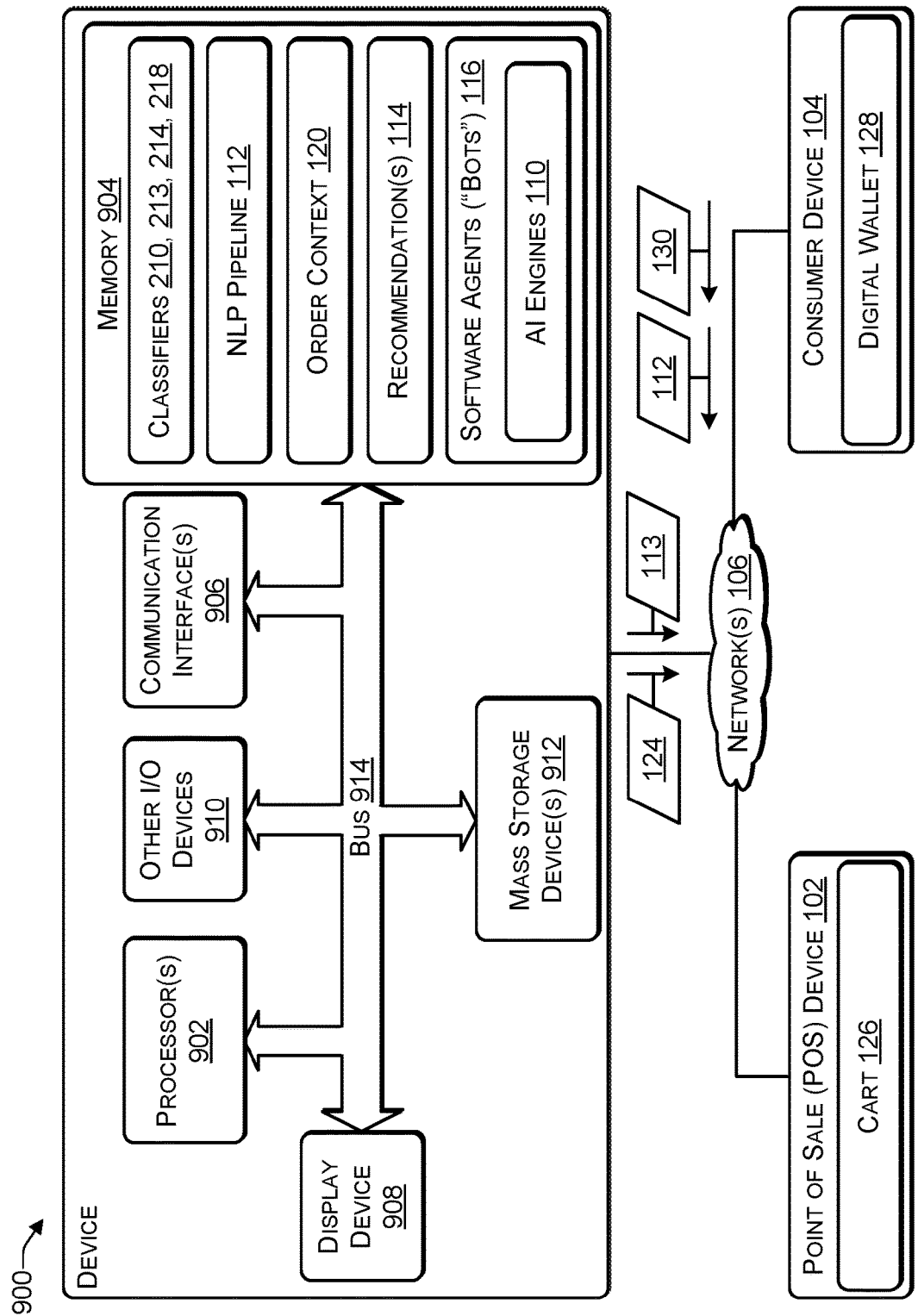
FIG. 9 illustrates an example configuration of a computing device that can be used to implement the systems and techniques described herein.

FIG. 9 illustrates an example configuration of a device 900 that can be used to implement the systems and techniques described herein, such as, for example, the customer device 104 and/or the server 106 of FIG. 1. For illustration purposes, the device 900 is illustrated in FIG. 9 as implementing the server 106 of FIG. 1.

The device 900 may include one or more processors 902 (e.g., CPU, GPU, or the like), a memory 904, communication interfaces 906, a display device 908, other input/output (I/O) devices 910 (e.g., keyboard, trackball, and the like), and one or more mass storage devices 912 (e.g., disk drive, solid state disk drive, or the like), configured to communicate with each other, such as via one or more system buses 914 or other suitable connections. While a single system bus 914 is illustrated for ease of understanding, it should be understood that the system buses 914 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, etc.

The processors 902 are one or more hardware devices that may include a single processing unit or a number of processing units, all of which may include single or multiple computing units or multiple cores. The processors 902 may include a graphics processing unit (GPU) that is integrated into the CPU or the GPU may be a separate processor device from the CPU. The processors 902 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 902 may be configured to fetch and execute computer-readable instructions stored in the memory 904, mass storage devices 912, or other computer-readable media.

Memory 904 and mass storage devices 912 are examples of computer storage media (e.g., memory storage devices)

for storing instructions that can be executed by the processors 902 to perform the various functions described herein. For example, memory 904 may include both volatile memory and non-volatile memory (e.g., RAM, ROM, or the like) devices. Further, mass storage devices 912 may include hard disk drives, solid-state drives, removable media, including external and removable drives, memory cards, flash memory, floppy disks, optical disks (e.g., CD, DVD), a storage array, a network attached storage, a storage area network, or the like. Both memory 904 and mass storage devices 912 may be collectively referred to as memory or computer storage media herein and may be any type of non-transitory media capable of storing computer-readable, processor-executable program instructions as computer program code that can be executed by the processors 902 as a particular machine configured for carrying out the operations and functions described in the implementations herein.

The device 900 may include one or more communication interfaces 906 for exchanging data via the network 108. The communication interfaces 906 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 906 can also provide communication with external storage, such as a storage array, network attached storage, storage area network, cloud storage, or the like.

The display device 908 may be used for displaying content (e.g., information and images) to users. Other I/O devices 910 may be devices that receive various inputs from a user and provide various outputs to the user, and may include a keyboard, a touchpad, a mouse, a printer, audio input/output devices, and so forth.

The computer storage media, such as memory 904 and mass storage devices 912, may be used to store software and data, including, for example, the classifiers 210, 213, 214, 218, the NLP pipeline 112, the order context 120, the recommendations 114, and the software agents 116.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   receiving, by an artificial intelligence engine executing on a server, an utterance from a customer, the utterance included in a conversation between the artificial intelligence engine and the customer;
   creating text based on the utterance;
   determining a customer intent based on the text and a user history;
   determining a user model of the customer based on the text and the customer intent, the user model identifying:
   an urgency level of the customer;
   a cost sensitivity of the customer;
   a current emotion of the customer; and
   a comfort level of the customer associated with conversing with the artificial intelligence engine;
   updating a conversation state associated with the conversation based on the customer intent and the user model;
   determining a user state based on the user model and the conversation state;
   selecting, using a reinforcement learning based module executing on the server, a particular action from a set of actions, the particular action including a response, the particular action selected to cause the customer to change a negative emotional state to a positive emotional state and to maintain the positive emotional state for a remainder of the conversation; and
   providing, by the artificial intelligence engine, the response to the customer.

2. The method of claim 1, further comprising:
   determining, based at least in part on the user state and the conversation state, a reward for the reinforcement learning based module, wherein the reward comprises one of a positive reward, a negative reward, or a neutral reward.

3. The method of claim 2, wherein:
   the reward comprises the positive reward when the text includes a recommendation indication of an acceptance of a recommendation, an emotion indication of a positive emotional state, a number of turns in the conversation, or any combination thereof.

4. The method of claim 2, wherein:
   the reward comprises the negative reward when the text includes a recommendation indication of a rejection of a recommendation, an emotion indication of a negative emotional state, a clarification request, a number of turns in the conversation, or any combination thereof.

5. The method of claim 1, wherein the user history comprises:
an order history associated with the customer;
a conversation history of the conversation; and
user feedback previously provided by the customer.

6. The method of claim 5, wherein the order history comprises:
one or more items of a current order that have been placed in a cart; and
previously ordered items from one or more previous orders.

7. The method of claim 1, wherein the customer intent comprises at least one of:
initiating an order;
adding an item to a cart;
deleting the item from the cart;
modifying the item in the cart;
requesting addition information regarding a menu item;
indicating that the customer has completed the order;
paying for an order; or
any combination thereof.

8. A server comprising:
one or more processors; and
one or more non-transitory computer readable media storing instructions executable by the one or more processors to perform operations comprising:
receiving, by an artificial intelligence engine, an utterance from a customer, the utterance included in a conversation between the artificial intelligence engine and the customer;
converting the utterance to text;
determining a customer intent based on the text and a user history;
determining a user model of the customer based on the text and the customer intent, the user model identifying:
an urgency level of the customer;
a cost sensitivity of the customer;
a current emotion of the customer; and
a comfort level of the customer associated with conversing with the artificial intelligence engine;
updating a conversation state associated with the conversation based on the customer intent and the user model;
determining a user state based on the user model and the conversation state;
selecting, using a reinforcement learning based, a particular action from a set of actions, the particular action including a response, the particular action selected to cause the customer to:
change a negative emotional state to a positive emotional state; and
maintain the positive emotional state for a remainder of the conversation; and
providing, by the artificial intelligence engine, the response to the customer.

9. The server of claim 8, further comprising:
determining, based on one or more of the utterance, the customer intent, the user history, the user model, the user state, or any combination thereof, a cost sensitivity of the customer; and
adjusting the reinforcement learning based module based on the cost sensitivity.

10. The server of claim 9, wherein adjusting the reinforcement learning based module based on the cost sensitivity comprises:
recommending lower cost menu items when the cost sensitivity is high; and
recommending higher cost menu items when the cost sensitivity is low.

11. The server of claim 8, wherein the user model comprises one or more of:
an urgency level of the customer;
a comfort level associated with the customer in conversing with the artificial intelligence engine;
a cost sensitivity of the customer; or
any combination thereof.

12. The server of claim 8, further comprising:
determining, based on one or more of the utterance, the customer intent, the user history, the user model, the user state, or any combination thereof, an urgency level associated with the customer; and
adjusting a verbosity of the reinforcement learning based module based on the urgency level, wherein the verbosity is decreased when the urgency level is high.

13. The server of claim 8, further comprising:
determining, based on one or more of the utterance, the customer intent, the user history, the user model, the user state, or any combination thereof, a comfort level of the customer in conversing with the artificial intelligence engine; and
adjusting the reinforcement learning based module based on the comfort level, wherein the reinforcement learning based module provides the customer with conversing suggestions based on determining that the comfort level is below a threshold.

14. The server of claim 8, wherein:
the reinforcement learning based module comprises an epsilon-greedy random algorithm that picks:
a current best option a threshold percentage of times; and
a random option having a low probability at remaining times.

15. A memory device to store instructions executable by one or more processors to perform operations comprising:
receiving, by an artificial intelligence engine executed by the one or more processors, an utterance from a customer, the utterance included in a conversation between the artificial intelligence engine and the customer;
creating text based on the utterance;
determining a customer intent based on the text and a user history;
determining a user model of the customer based on the text and the customer intent;
updating a conversation state associated with the conversation based on the customer intent and the user model, the user model identifying:
an urgency level of the customer;
a cost sensitivity of the customer;
a current emotion of the customer; and
a comfort level of the customer associated with conversing with the artificial intelligence engine;
determining a user state based on the user model and the conversation state;
selecting, using a reinforcement learning based module executed by the one or more processors, a particular action from a set of actions, the particular action including a response, the particular action selected to cause the customer to:
change a negative emotional state to a positive emotional state; and
maintain the positive emotional state for a remainder of the conversation; and
providing, by the artificial intelligence engine, the response to the customer.

16. The memory device of claim 15, wherein the conversation state comprises one or more of:
items included in a cart associated with the customer;
a conversation history of the conversation including a previous utterance of the customer and a previous response provided by the artificial intelligence engine;

the text;
a recommendation history including current recommendation provided in the conversation and previous recommendations provided in previous conversations;
an average emotional sentiment associated with the conversation; or
any combination thereof.

17. The memory device of claim 15, wherein the user history comprises:
an order history associated with the customer;
a conversation history of the conversation; and
user feedback previously provided by the customer.

18. The memory device of claim 15, wherein the customer intent comprises at least one of:
initiating an order;
adding an item to a cart;
deleting the item from the cart;
modifying the item in the cart;
requesting addition information regarding a menu item;
indicating that the customer has completed the order;
paying for an order; or
any combination thereof.

19. The memory device of claim 15 further comprising:
determining, based at least in part on the user state and the conversation state, a reward for the reinforcement learning based module, wherein the reward comprises one of a positive reward, a negative reward, or a neutral reward.

20. The memory device of claim 15, wherein:
the reinforcement learning based module comprises an epsilon-greedy random algorithm that picks:
a current best option a threshold percentage of times; and
a random option having a low probability at remaining times.

* * * * *